US012629593B2

(12) United States Patent
Lee

(10) Patent No.: US 12,629,593 B2
(45) Date of Patent: May 19, 2026

(54) METHOD, DEVICE, AND COMPUTER PROGRAM FOR DISPLAYING INTERACTION GRAPHIC USER INTERFACE

(71) Applicant: NEXON KOREA CORPORATION, Seongnam-si (KR)

(72) Inventor: Jin Hoon Lee, Seongnam-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 652 days.

(21) Appl. No.: 17/291,954

(22) PCT Filed: Nov. 7, 2018

(86) PCT No.: PCT/KR2018/013438
§ 371 (c)(1),
(2) Date: May 6, 2021

(87) PCT Pub. No.: WO2020/096080
PCT Pub. Date: May 14, 2020

(65) Prior Publication Data
US 2022/0001280 A1 Jan. 6, 2022

(51) Int. Cl.
*A63F 13/533* (2014.01)
*A63F 13/23* (2014.01)
(Continued)

(52) U.S. Cl.
CPC ............ *A63F 13/533* (2014.09); *A63F 13/23* (2014.09); *A63F 13/45* (2014.09); *A63F 13/58* (2014.09);
(Continued)

(58) Field of Classification Search
CPC ........ A63F 13/533; A63F 13/23; A63F 13/45; A63F 13/58; A63F 2300/308; A63F 2300/65; G06B 3/0482
See application file for complete search history.

(56) References Cited

U.S. PATENT DOCUMENTS 8,298,088 B2    10/2012  Lee
9,174,131 B2 *  11/2015  Shirasaka ............. A63F 13/822
(Continued)

FOREIGN PATENT DOCUMENTS

KR    10-2010-0115045 A    10/2010
KR    10-2014-0122610 A    10/2014
(Continued)

OTHER PUBLICATIONS

International Search Report and Written Opinion for PCT/KR2018/013438 mailed Aug. 14, 2019, 9 pages.
(Continued)

*Primary Examiner* — Thomas H Henry
(74) *Attorney, Agent, or Firm* — Kilpatrick Townsend & Stockton LLP

(57) ABSTRACT

The present disclosure provides a game providing method including determining at least one object interactable with a player in a space where the player is located; displaying an interaction graphic user interface (GUI) corresponding to one object of the at least one object in a display area independent of the at least one object; and displaying a subsidiary GUI of the interaction GUI in an area overlapping at least a portion of the display area without displaying the interaction GUI when an interaction between the player and the one object is activated.

20 Claims, 21 Drawing Sheets

(51) Int. Cl.
    *A63F 13/45*       (2014.01)
    *A63F 13/58*       (2014.01)
    *G06F 3/0482*     (2013.01)

(52) U.S. Cl.
    CPC ...... *G06F 3/0482* (2013.01); *A63F 2300/308*
            (2013.01); *A63F 2300/65* (2013.01)

(56)          References Cited

U.S. PATENT DOCUMENTS

| | | | |
|---|---|---|---|
| 2006/0046803 A1* | 3/2006 | Suzuki | A63F 13/52 |
| | | | 463/8 |
| 2014/0274410 A1* | 9/2014 | Maynard | G06F 3/0482 |
| | | | 463/42 |
| 2015/0105147 A1 | 4/2015 | Franzas et al. | |
| 2018/0143751 A1 | 5/2018 | Liu et al. | |
| 2020/0353355 A1* | 11/2020 | Wang | G06F 3/0481 |
| 2022/0410011 A1* | 12/2022 | Guzik | A63F 13/65 |

FOREIGN PATENT DOCUMENTS

| | | |
|---|---|---|
| KR | 0-1525401 B1 | 6/2015 |
| KR | 10-154739 B1 | 8/2015 |
| KR | 10-1735902 B1 | 5/2017 |

OTHER PUBLICATIONS

Hornshaw et al., "9 tips to help you master Fortnite on your smartphone," Digital Trends, Mar. 17, 2021, 19 pages. Retrieved from https://www.digitaltrends.com/gaming/fornite-mobile-beginners-guide/.

Apple Support, "Use Assistive Touch on your iPhone, iPad, or iPod touch," Mar. 5, 2020, 4 pages.

MapleStory/Mini Dungeons strategies, Feb. 22, 2014, 3 pages. Retrieved from https://strategywiki.org/w/index.php?title=MapleStory/Mini_Dungeons&oldid=696028.

Star Wars Fandom site "Star Wars: Knights of the Old Republic, 2003, 42 pages Retrieved from https://starwars.fandom.com/wiki/Star_Wars:_Knights_of_the_Old_Republic?oldid=10296166".

Call of Duty mobile site, 2021, 5 pages Retrieved from https://www.callofduty.com/mobile.

Office Action for Korean Appln No. 10-2018-0136143 dated Dec. 11, 2020, 3 pages.

Notification of Reason for Refusal for Korean Application No. 10-2018-0136143 mailed Aug. 11, 2020, 2 pages.

Notice of Grant of Patent for Korean Application No. 10-2018-0136143 mailed Dec. 11, 2020, 3 pages.

\* cited by examiner

METHOD, DEVICE, AND COMPUTER PROGRAM FOR DISPLAYING INTERACTION GRAPHIC USER INTERFACE

TECHNICAL FIELD

The present disclosure relates to a game providing method, a game providing device, and a game providing program, and to a technology for displaying an interactive graphic user interface in a game.

BACKGROUND ART

As devices and network environments are developed, game providers provide games to users through various devices, and demands of the user for games are also diversified.

A game operating method may be changed depending on environments in which games are played. For example, a game may be played by using a keyboard and a mouse in a desktop environment and may be played by using a touchscreen in a mobile environment such as a smartphone or a tablet.

A separate monitor may be used in a desktop environment, and a game may be played at a high resolution. In general, as a resolution increases, a display size of a graphic user interface (GUI) in a game may be reduced. Accordingly, even on monitors having the same size, a size of a GUI in a game may be adjusted by adjusting a resolution.

In addition, in a mobile environment, a touchscreen having a limited size is used in general. It is difficult to adjust a resolution of a game in the mobile environment, unlike in a desktop environment, and when a size of a GUI is reduced in a game by increasing a resolution, a problem occurs in that the GUI on a screen is hard to be touched.

Accordingly, in order to provide an improved user experience to a user who enjoys a game in a mobile environment, a GUI necessary for the user needs to be arranged in a proper location on a screen. However, when all GUIs necessary for a user are arranged on a screen in a mobile environment, content or an object on the screen may be covered by the GUIs, and furthermore, aesthetic sensibility of a game may be reduced.

In order to prevent a screen from being unnecessarily covered by the GUIs, a method of minimizing the number of displayed GUIs and directly touching the content or the object on the screen may be considered. According to the method, an action of attacking a corresponding enemy may be performed when the enemy is touched on the screen, and an action of moving to a treasure box and opening the treasure box when the treasure box is touched on the screen may be performed. This method causes a user to concentrate excessively on all objects displayed on a screen, and thus, the user may be tired of viewing a small screen, and particularly, in a mobile device having a display size of 4 inches or more, it is difficult to operate all objects on the screen in a right time with one hand. In addition, a location in a screen on which a user has to perform an interaction is continuously changed according to a displayed object, and thus, it is difficult to provide a unified feeling of operation to the user.

DESCRIPTION OF EMBODIMENTS

Technical Problem

The present disclosure provides a system for a GUI that is easily operated with one hand in a game.

The present disclosure provides a system for providing a unified feeling of operation to a user in a game.

Solution to Problem

The present disclosure may provide a game providing method including determining at least one object interactable with a player in a space where the player is located; displaying an interaction graphic user interface (GUI) corresponding to one object of the at least one object in a display area independent of the at least one object; and displaying a subsidiary GUI of the interaction GUI in an area overlapping at least a portion of the display area without displaying the interaction GUI when an interaction between the player and the one object is activated.

The interaction GUI may be not displayed while the player is moved based on a manual input.

The game providing method may further include displaying a movement GUI corresponding to the manual input.

The interaction GUI may be displayed in response to stopping movement of the player.

The interaction between the player and the one object may be activated based on selection of the interaction GUI.

The game providing method may further include displaying a list of the at least one object, wherein, when the one object is selected from the list, the interaction between the player and the one object is activated.

The game providing method may further include displaying a basic GUI related to setting of the player, wherein, when the interaction between the player and the object is activated, the basic GUI is not displayed and the subsidiary GUI is displayed.

The game providing method may further include causing the player to enter an auto battle mode against the one object in response to activation of the interaction between the player and the one object when the one object is hostile to the player, wherein the one object is targeted by the player.

The subsidiary GUI may include a skill GUI that is usable while the player fights against the one object.

The display area may be located in the center of a lower portion of a screen, and the subsidiary GUI may be arranged in a line at the lower portion, in a portrait mode.

The game providing method may further include re-displaying the interaction GUI in response to an input for moving the player, wherein the interaction GUI is displayed together with the subsidiary GUI and the auto battle mode is paused while the player is moving.

The interaction GUI may be re-displayed as pushing the subsidiary GUI outwards from the display area.

The subsidiary GUI may be reduced in size as being pushed outwards from the display area by the interaction GUI.

The subsidiary GUI may be pushed to the left and right from the display area in a portrait mode.

The auto battle mode may be resumed and the interaction GUI may be not displayed and the subsidiary GUI may be displayed in response to selection of the interaction GUI or the subsidiary GUI.

The display area may be located in a lower right end portion or a lower left end portion of a screen and the subsidiary GUI may be arranged in at least one row at the lower right end portion or the lower left end portion in a landscape mode.

The game providing method may further include re-displaying the interaction GUI in response to an input for moving the player as pushing the subsidiary GUI in a radial direction from the display area, wherein the interaction GUI is displayed together with the subsidiary GUI and the auto battle mode is paused while the player is moving.

The one object may be untargeted by the player based on a distance between the player and the one object.

The at least one object may be located within a predetermined area in the space.

The one object may be targeted by the player.

The one object may be closest to the player among the at least one object in the space.

The interaction GUI may have a state corresponding to a property of the one object.

The interaction GUI may be a dialog GUI, an auto battle GUI, an automatic movement GUI, an acquisition GUI, a boarding GUI, or a transaction GUI.

The game providing method may further include re-displaying the interaction GUI without displaying an interaction stop GUI included in the subsidiary GUI in response to selection of a movement stop GUI, wherein movement of the player is stopped in response to selection of the movement stop GUI.

In addition, the present disclosure may provide a computer program combined with hardware and stored in a medium to perform the game providing method.

In addition, a computer-readable recording medium may provide a program configured to cause a computer to execute the game providing method.

In addition, a game providing device includes a memory configured to store instructions; and at least one processor configured to execute the instructions, wherein the processor executes the instructions to determine at least one object interactable with a player in a space where the player is located, to display an interaction graphic user interface (GUI) corresponding to one object of the at least one object in a display area independent of the at least one object, and to display a subsidiary GUI of the interaction GUI in an area overlapping at least a portion of the display area without displaying the interaction GUI when an interaction between the player and the one object is activated.

Advantageous Effects of Disclosure

According to an embodiment, a game of a GUI that is easy to operate even with one hand may be provided.

According to an embodiment, a game with a unified feeling of operation may be provided to a user.

BEST MODE

Figure 1A:
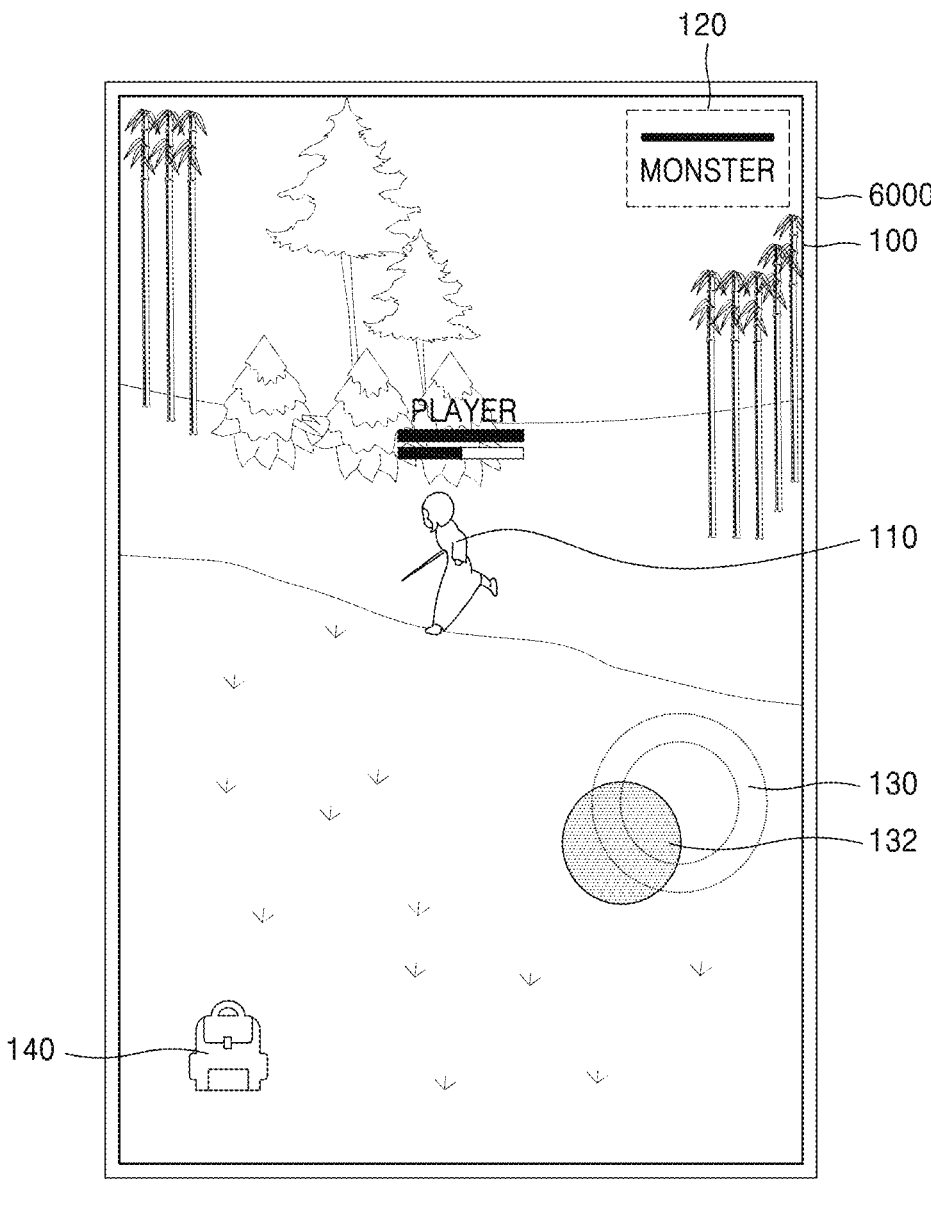
FIGS. 1A, 1B, 1C, and 1D are views showing a graphic user interface (GUI) of a game according to an embodiment.

The present disclosure may provide a game providing method including determining at least one object interactable with a player in a space where the player is located; displaying an interaction graphic user interface (GUI) corresponding to one object of the at least one object in a display area independent of the at least one object; and displaying a subsidiary GUI of the interaction GUI in an area overlapping at least a portion of the display area without displaying the interaction GUI when an interaction between the player and the one object is activated.

Mode of Disclosure

Hereinafter, example embodiments according to the present disclosure will be described in detail with reference to contents described in the accompanying drawings. In addition, a method of configuring and using an electronic device, according to an embodiment of the present disclosure, will be described in detail with reference to contents described in the accompanying drawings. The same reference numerals or symbols of the respective drawings indicate components or configuration elements that perform substantially the same function.

Terms including ordinal numbers such as "first" and "second" may be used to describe various configuration elements, but the configuration elements are not limited to the terms. The terms are used only for the purpose of distinguishing one configuration element from another configuration element. For example, a first configuration element may be referred to as a second configuration element without departing from the scope of the present disclosure, and similarly, the second configuration element may be referred to as the first configuration element. A term "and/or" includes a combination of a plurality of related items or any one of the plurality of related items.

Terms used in the present disclosure are used to describe the embodiments and are not intended to limit and/or restrict the present disclosure. Singular expressions include plural expressions unless the context clearly indicates otherwise. In the present disclosure, terms such as "comprise" or "have" are intended to designate presence of features, numbers, steps, operations, configuration elements, components, or combinations thereof described in the specification, and it should be understood that possibility of presence or addition of one or more other features, numbers, steps, operations, configuration elements, components, or combinations thereof is not precluded.

In the present disclosure, when a portion is connected to another portion, this includes not only a case of being directly connected, but also a case of being electrically connected with another element interposed therebetween. In addition, when a portion includes a certain configuration element, this means that other configuration elements may be further included rather than excluding the other configuration elements unless specifically stated to the contrary. In addition, terms such as " . . . unit", " . . . portion", and "module" described in the specification mean a unit that processes at least one function or operation, which may be implemented as hardware or software, or as a combination of hardware and software.

It should be understood that, in the present disclosure, a "terminal" may indicate a user, a gamer, and a player, or indicate a device used thereby, depending on context. It should be understood that, in the present disclosure, a user, a gamer, or a player may indicate an avatar or a character operated by them or a device used by them, depending on context.

In the present disclosure, a "platform connected to terminals" refers to a community to which users of terminals belong and may be, for example, a game or a virtual game space provided by the game but is not limited thereto. A user's avatar or character may exist in a virtual game space. The platform may be a centralized platform being operated on a server and connecting terminals to a server but may be a decentralized platform that operates on a terminal to connect terminals to each other or operates on a node to which terminals are connected to connect the terminals to each other.

In the present disclosure, an "object" indicates all digital content existing in a virtual space such as an online game. For example, the object may be a user's avatar or character, or a non-player character (NPC), for example, a monster, a villager, a store owner, or so on and may be an item used in a game but is not limited thereto. An object may be traded with a predetermined value. For example, an object may be traded between terminals or between a terminal and a server. An object may be operated by a user or may interact with a user's character but is not limited thereto. For example, an object may also indicate a background that configures a virtual space (for example, a grassland, a forest, a desert, a dungeon, a village, a sea, or so on), a structure (for example, a house, a tower, a fountain, a wall, a lighthouse, or so on), a thing (for example, grass, a tree, a rock, rain, snow, fire, coral, or so on), or so on. An object may function as a passage through which a character may pass but may also function as an obstacle through which the character may not pass. An object may be visual, auditory, tactile, and/or olfactory. A visualized object may be expressed in three dimension (3D) or two dimension (2D), and an object expressed in 2D may be recognized as 3D by a user, or an object expressed in 3D may be recognized as 2D by a user.

FIGS. 1A, 1B, 1C, and 1D are views showing a graphic user interface (GUI) of a game according to an embodiment.

Referring to FIG. 1A, a game 100 may be provided to a user by a game providing device 6000 according to an embodiment. The game 100 may be an action role playing game (RPG) game as shown in FIG. 1A but is not limited thereto, and various games may be provided to a user by the game providing device 6000. The game 100 is not limited to a 2D game or a 3D game, and may also be an immersive virtual reality game, an augmented reality game, or the like. The game 100 may be an online game but is not limited thereto and may be an offline game executed by one device or may be a short-range network game executed by two or more devices connected to each other. In the present disclosure, the game 100 may also indicate a GUI of the game 100 displayed by the game providing device 6000.

Referring to FIG. 1A, a user may operate a player 110 by touching a screen of the game providing device 6000 on which the game 100 is displayed. For example, the player 110 may move based on a user's manual input. In the present disclosure, movement based on the manual input may be referred to as manual movement. As shown in FIG. 1A, the game providing device 6000 may display mobile GUIs 130 and 132 corresponding to the user's manual input. For example, an area of a screen on which the game 100 is displayed is touched and then a pointing device (for example, a finger) is moved to a lower left end while maintaining the touch, and thus, the player 110 may be moved in a lower left direction. In the game 100, a movement GUI may indicate that the pointing device is moved to the lower left end while maintaining the touch and may also indicate a direction of movement of the player 110 at the same time.

Referring to FIG. 1A, a basic GUI 140 related to setting of the player 110 may be displayed in the game 100. For example, as shown in FIG. 1A, the basic GUI 140 may be an inventory GUI capable of confirming an item possessed by the player 110 but is not limited thereto. For example, the basic GUI 140 may further include an equipment GUI that enables the player 110 to confirm a currently equipped equipment.

Figure 1B:
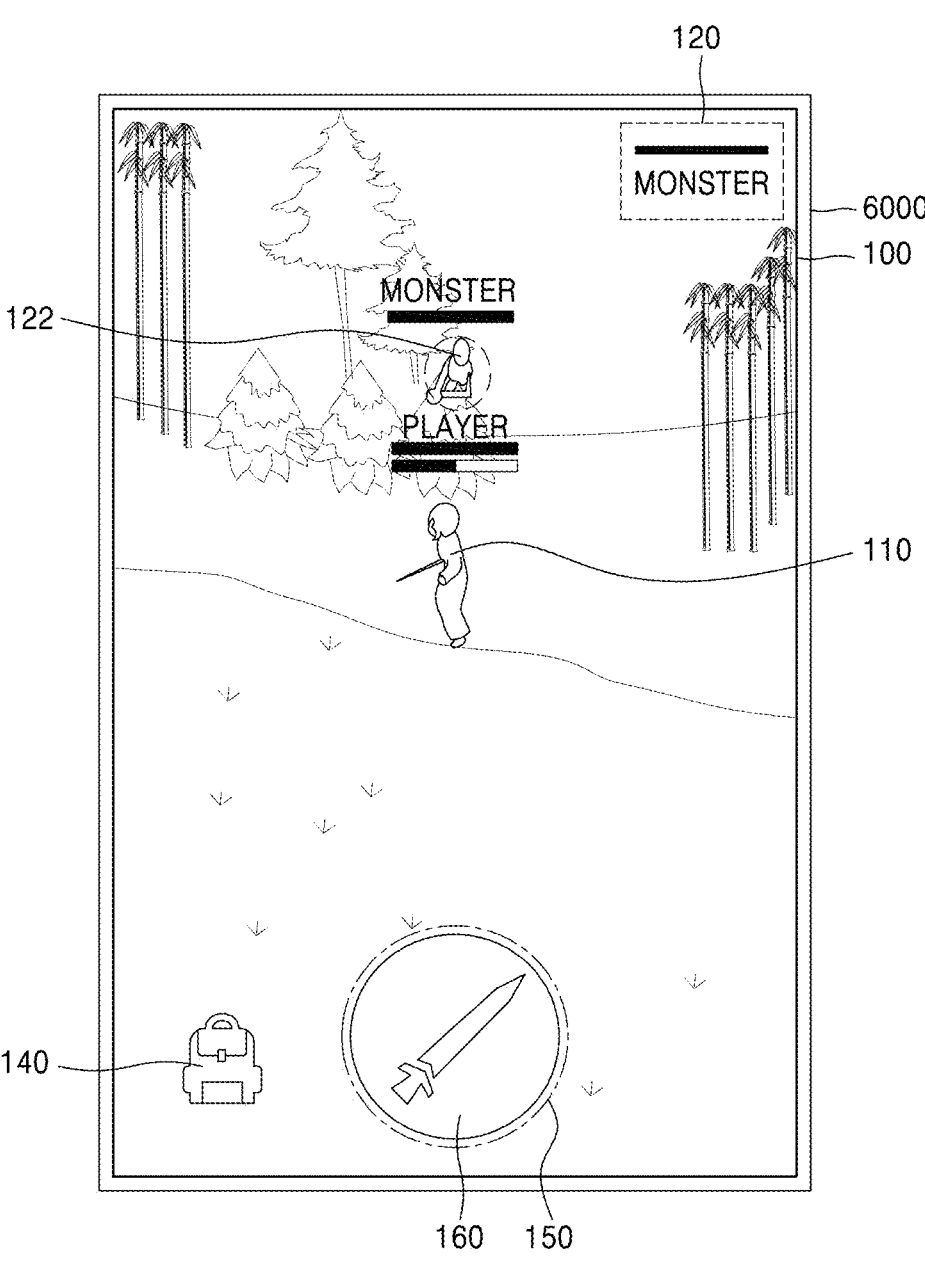

Referring to FIG. 1B, when an object 122 that the player 110 may interact with appears in the game 100 or the object 122 that the player 110 may interact with is detected in a space where the player 110 is located, the game providing device 6000 may display the interaction GUI 160 corresponding to the object 122. According to one embodiment, a list 120 of objects that the player 110 may interact with may also be displayed. Here, the interaction GUI 160 may be displayed in a predetermined display area 150. In FIG. 1B, the predetermined display area 150 is shown by a dashed line, but the predetermined display area 150 may be a virtual area that is not displayed in the game 100. As shown in FIG. 1B, when an interactable object 122 is a monster that the player 110 may attack or is hostile to the player 110, the interaction GUI 160 may be expressed as an attack GUI 160. When the corresponding object 122, that is, a name of a monster, is touched in selection or the list 120 of the attack GUI 160, the player 110 may attack the object 122, which is a monster.

According to one embodiment, when there is no object with which the player 110 may interact in the game, the interaction GUI 160 is not displayed, and thus, all contents in the game 100 may be completely viewed by a user. Furthermore, a user may immediately check the presence or absence of an object that may be interacted with in the current game 100 according to whether or not the interaction GUI 160 is displayed. Thus, user experience of the game 100 may be increased.

According to one embodiment, when the player 110 stops movement while moving according to a manual input in a non-battle mode, for example, when a touch to the game providing device 6000 is released, the interaction GUI 160 may also be displayed. In addition, when the player 110 resumes movement by the manual input in the non-battle mode and the movement continues, the interaction GUI 160 may not be displayed in the game 100. When the player 110 is moving in the non-battle mode, a user's intention may be to move quickly to a specific position rather than battle. According to one embodiment, when the player 110 is moving according to a manual input in the non-battle mode, the interaction GUI 160 is not displayed, and thus, the player 110 may completely concentrate on the movement.

According to one embodiment, an interaction between the object 122 and the player 110 may be activated based on selection of the interaction GUI 160 or selection of an object from the list 120. For example, referring to FIGS. 1B and 1C, when a name of the corresponding object 122 is selected from the interaction GUI 160 or the object list 120, the interaction between the player 110 and the corresponding object 122, that is, a battle mode of the player 110 against the object 122, may be activated, and the object 122 may be targeted by the player 110. Here, the battle mode may be an auto battle mode in which the player 110 automatically battles with the corresponding object 122. When entering the battle mode, the object 122 may be continuously targeted unless the player 110 defeats the object 122, the player 110 is defeated, or the player 110 does not run away from the object 122. That is, when the player 110 defeats the object 122, when the player 110 is defeated, or when the player 110 runs away from the object 122, the object 122 is untargeted such that a target of the player 110 with respect to the object 122 may be released.

According to one embodiment, when the interaction between the player 110 and the object 122 is activated, the game providing device 6000 causes the player 110 to enter an auto battle mode to the object 122, and may display subsidiary GUIs 161, 162, 163, 164, 165, and 166 of the interaction GUI 160 without displaying the interaction GUI 160. For example, when the interaction GUI 160 is an auto battle GUI 160, the subsidiary GUIs 161, 162, 163, 164, 165, and 166 of the auto battle GUI 160 may respond to skills that may be used by the player 110. In the auto battle mode, the player 110 may automatically attack the object 122 without additional operation. When the subsidiary GUI 161, 162, 163, 164, 165, or 166 is selected by a user's additional operation, a corresponding skill may be enforced to the object 122 by the player 110. Furthermore, the subsidiary GUI of the auto battle GUI 160 may further include an item GUI, and when the item GUI is selected, a corresponding item may be consumed by the player 110.

Figure 1C:
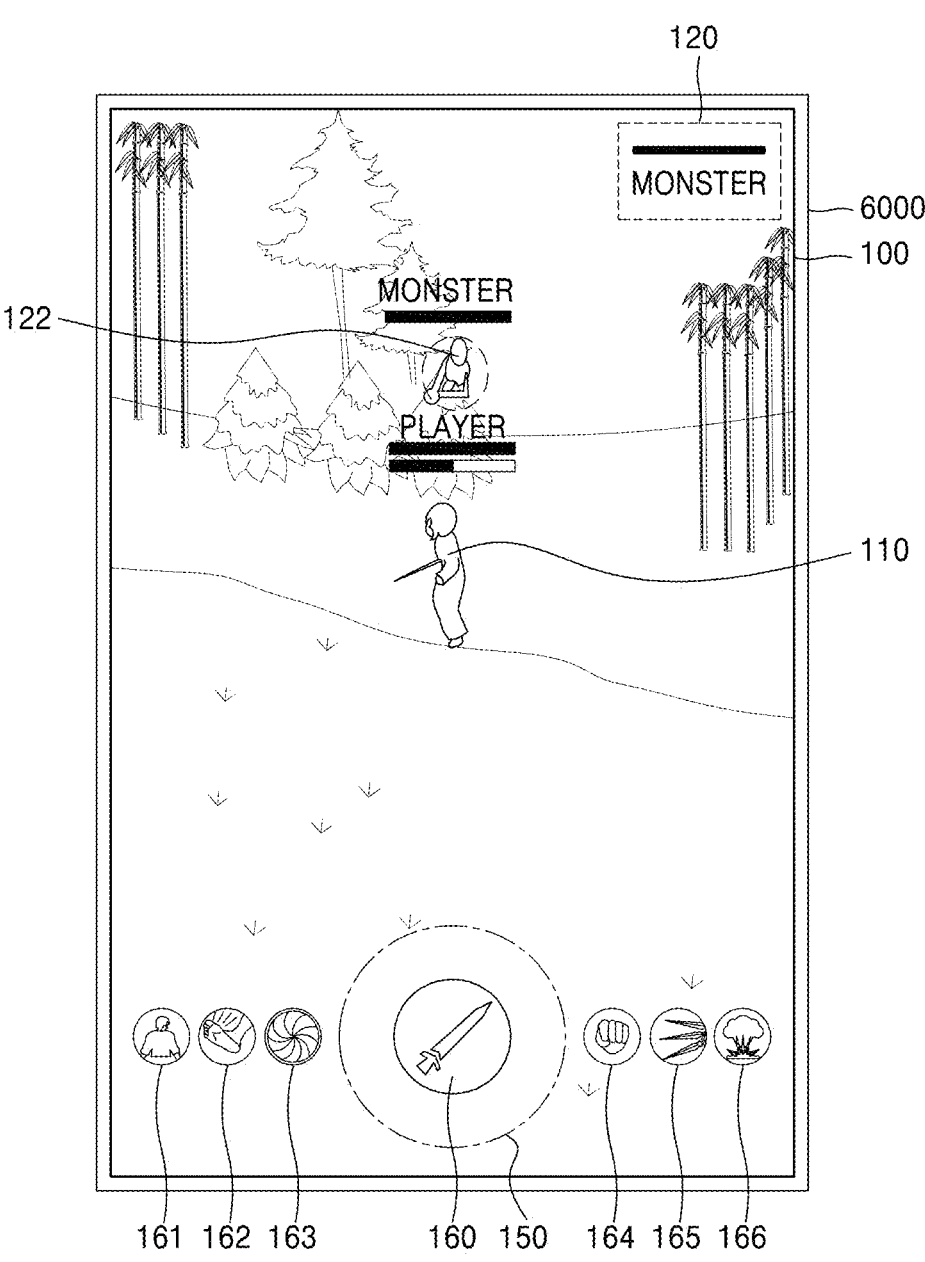
Figure 1D:
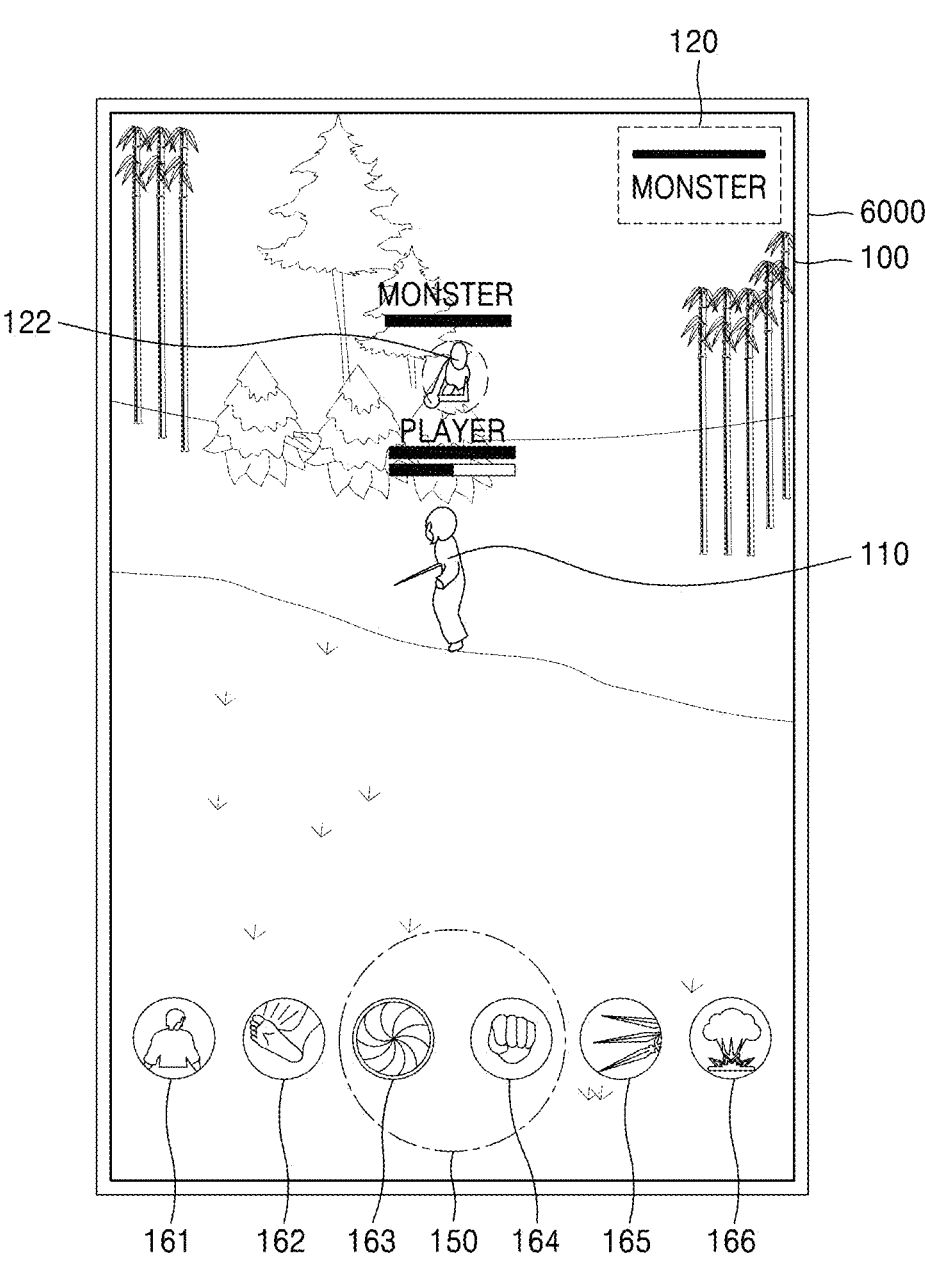

FIG. 1C shows a state immediately after the interaction GUI 160 is selected in the game 100. That is, when the interaction GUI 160 is selected, the game providing device 6000 may no longer display the interaction GUI 160 in a predetermined display area 150 as shown in FIG. 1D. FIG. 1C shows a state in which a size of the interaction GUI 160 is gradually reduced and disappears, and FIG. 1D shows a state in which the interaction GUI 160 disappears. According to one embodiment, as shown in FIG. 1C, the basic GUI 140 may also not be displayed in response to start of an interaction between the player 110 and the object 120.

According to one embodiment, some of the subsidiary GUIs 161, 162, 163, 164, 165, and 166 may be displayed in an area overlapping at least part of the area 150 in which the interaction GUI 160 is displayed. As shown in FIG. 1D, the interaction GUI 160 is not displayed in the area 150 where the interaction GUI 160 is displayed, and the subsidiary GUIs 161, 162, 163, 164, 165, and 166 may be displayed in the area 150. Here, a corresponding skill may be enforced to the object 122 by the player 110 in response to selection of the subsidiary GUI 161, 162, 163, 164, 165, or 166.

The related art has a problem that a GUI related to a corresponding mode is continuously displayed even in the auto battle mode. For example, while not in the auto battle mode, a corresponding GUI is expressed in a selectable form, and while in the auto battle mode, the corresponding GUI is greyed out or is expressed in an unselectable form. A screen in a mobile environment is wasted by being greyed out or by displaying an unselectable GUI. Furthermore, a user may also have an illusion of being able to perform an interaction.

According to one embodiment, the interaction GUI 160 is displayed or is not displayed according to a situation or context of a game, and thus, a user may intuitively check an action that may be performed in the game, that is, whether or not to interact with other objects.

Figure 2:
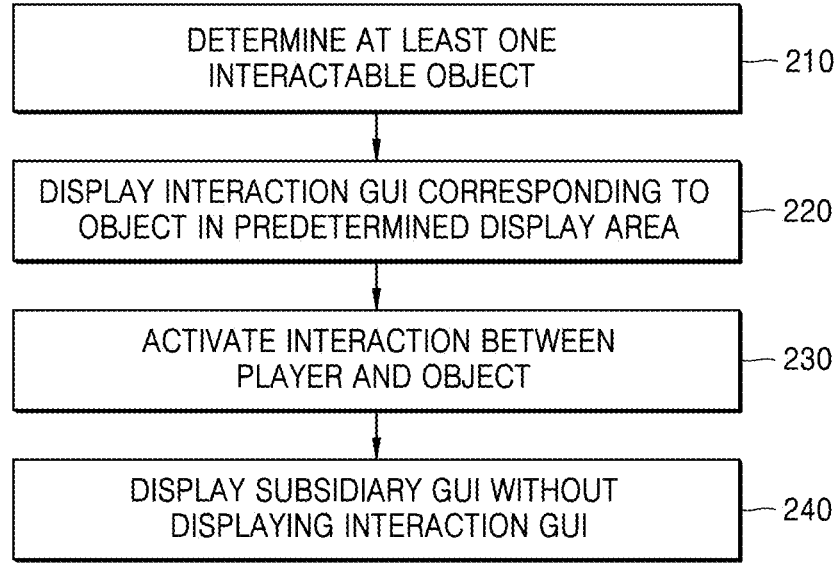
FIG. 2 is a flowchart of a method of providing a GUI of a game, according to an embodiment.

FIG. 2 is a flowchart of a method of providing a GUI of a game, according to an embodiment.

In step 210, a game providing device may determine at least one object capable of performing an interaction. At least one object capable of interaction may be determined within a space in which there is a player. For example, the space may be defined according to characteristics of a space within a game. For example, the space may include a dungeon, a village, a castle, a fortress, an underground cave, a grassland, a forest, a desert, a town, a sea, and so on, and a player may interact with an object in the same space. The space may also be defined as a place having the same place name in a game or may also be defined as a place expressed in the same map but is not limited thereto. For example, the space may indicate a space within a predetermined distance from a player.

In step 220, the game providing device may display an interaction GUI corresponding to one object in a predetermined display area. The one object may be one of at least one object that the player may interact with in a space where there is a player. Here, the predetermined display area may be independent of an object. For example, the display area may be a fixed area on a screen of the game providing device regardless of a property or a position of an object. The display area will be described below with reference to FIGS. 3A, 3B, 3C, 4A, 4B, and 4C.

In step 230, the game providing device may activate an interaction between a player and an object based on a user input. The one object may be one of at least one object determined in step 210. According to one embodiment, an interaction between a player and an object may start or may be activated based on selection of the interaction GUI, and when the interaction is paused, the interaction may also be resumed based on the selection of the interaction GUI. According to one embodiment, a list of at least one object determined in step 220 may be displayed in a game, and one object may be selected by a player from the list.

In step 240, the game providing device may display a subsidiary GUI without displaying an interaction GUI in response to activation of the interaction between the player and the object. That is, the interaction GUI displayed in step 220 may be hidden. According to one embodiment, an interaction GUI is not displayed and only a subsidiary GUI of the interaction GUI is displayed while a player and one object interact with each other, and thus, a relatively small screen may be efficiently utilized in a mobile environment.

Figure 3A:
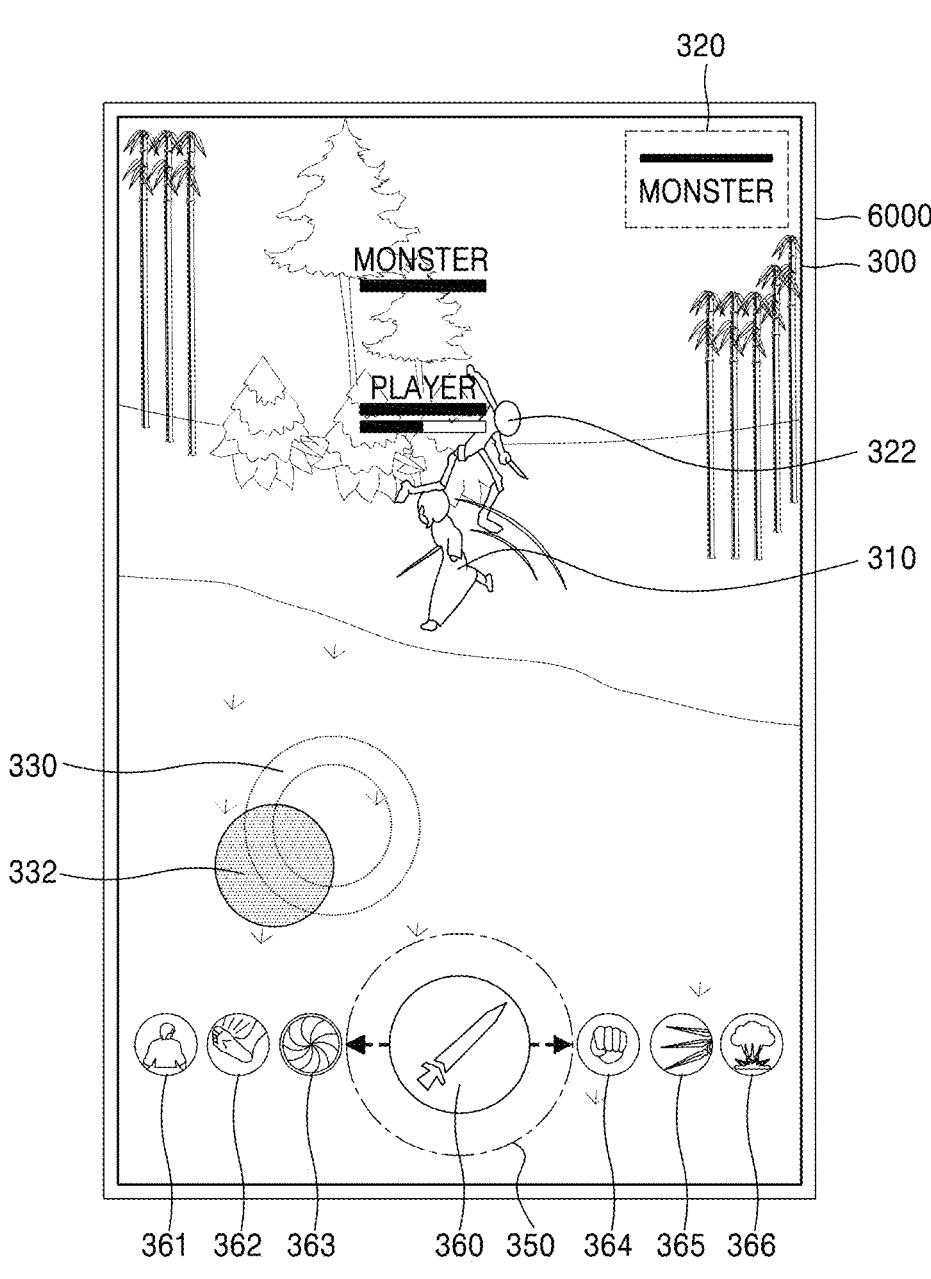
FIGS. 3A, 3B, and 3C are views showing a method of displaying an interaction GUI in a portrait mode, according to an embodiment.
Figure 3B:
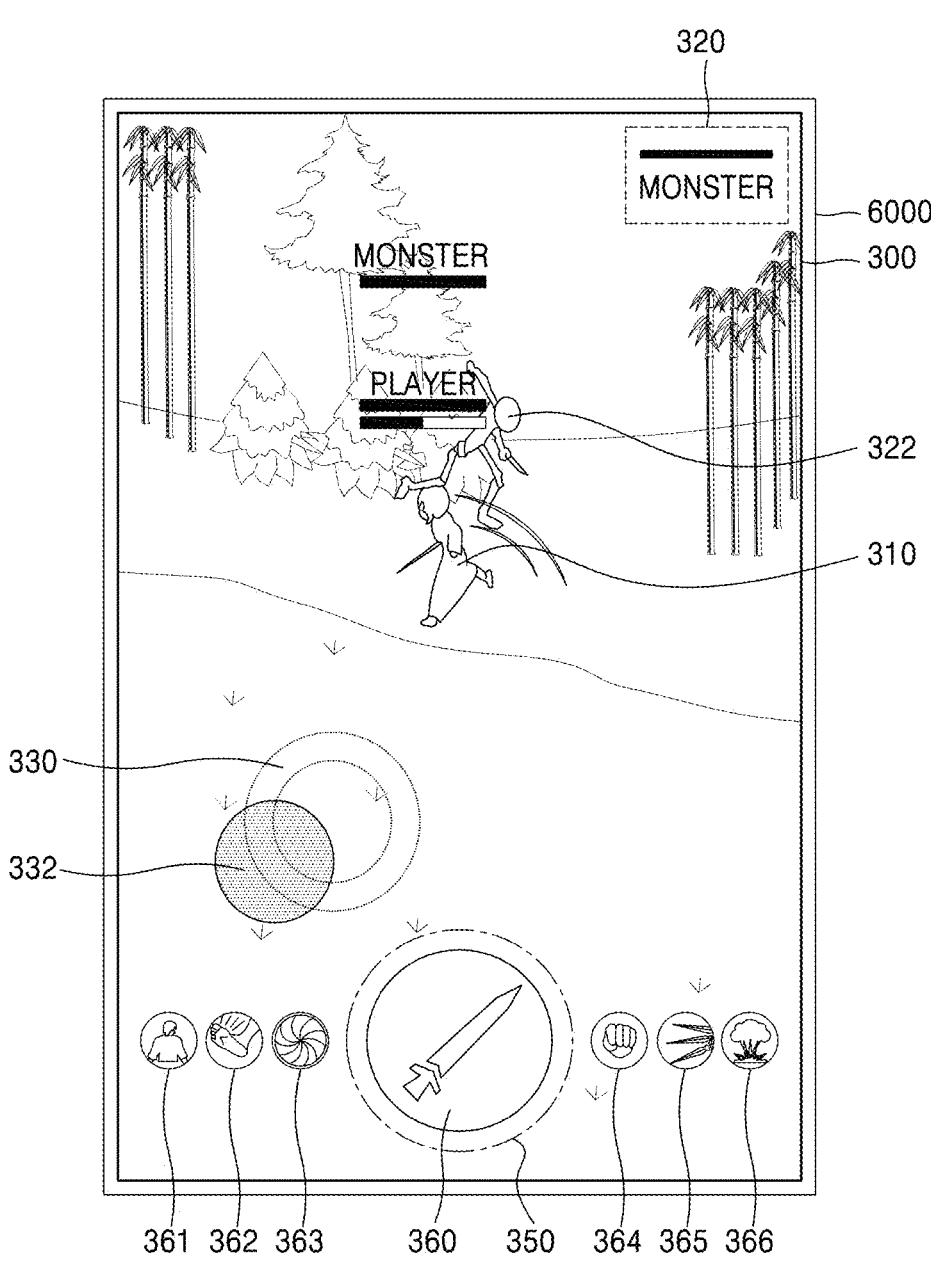
Figure 3C:
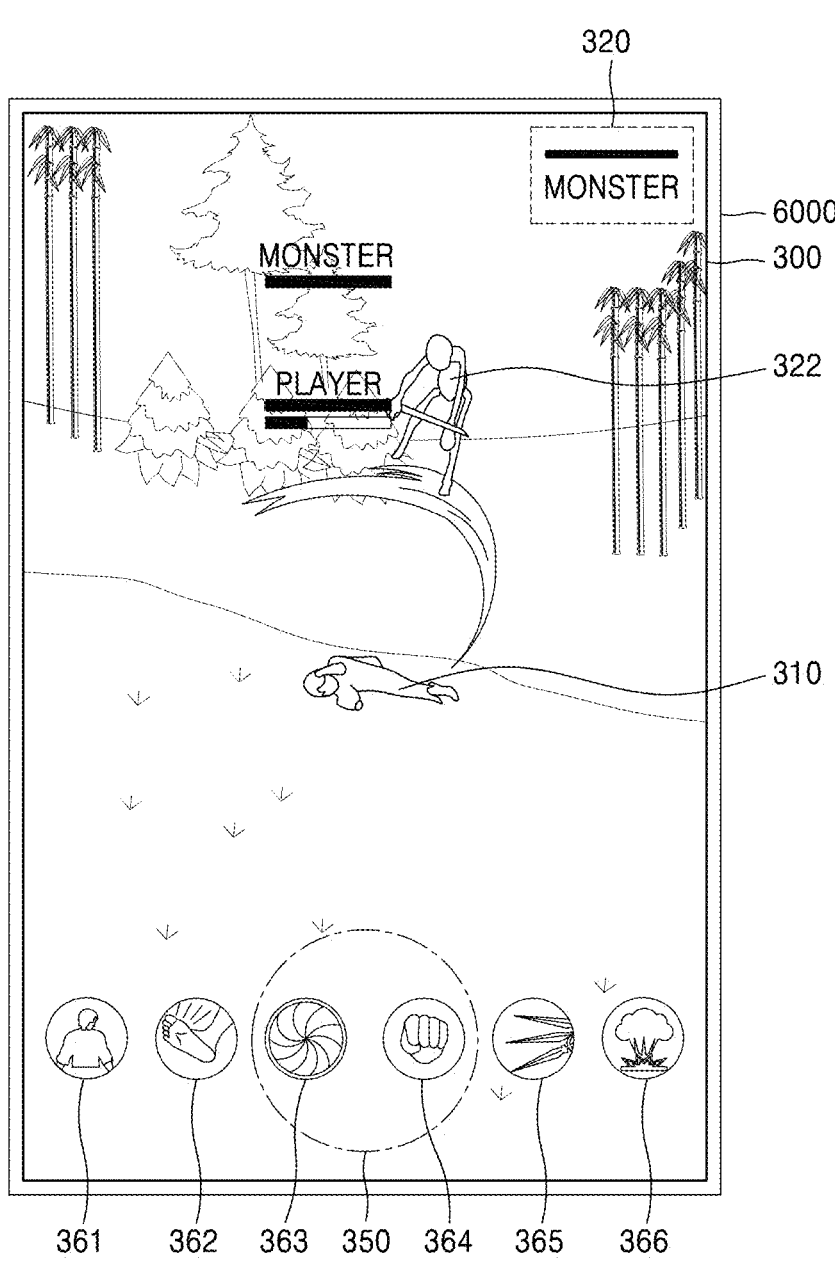

FIGS. 3A, 3B, and 3C are views showing a method of displaying an interaction GUI in a portrait mode, according to an embodiment.

According to one embodiment, an interaction GUI may be displayed in a display area independent of an object. Here, the display area independent of the object may indicate a fixed area according to device characteristics of the game providing device 6000 regardless of a property or a position of the object.

For example, referring to FIGS. 3A, 3B, and 3C, a display area 350 independent of an object 322 is located at the center of a lower end portion of the game providing device 6000, and the interaction GUI 360 is constantly displayed in the corresponding area 350 when displayed, and subsidiary GUIs 361, 362, 363, 364, 365, and 366 of the interaction GUI 360 may be arranged in a row at the corresponding lower end portion.

Here, the game providing device 6000 may be in a portrait mode or may be a device optimized for the portrait mode, for example, a smartphone. According to one embodiment, the interaction GUI 360 is constantly displayed only in the display area 350 when displayed in a game 300, and thus, a user may have a consistent user experience. Accordingly, a user may easily play the game 300 with only one hand and may easily perform various types of interactions with various objects in the game 300 without looking at a screen. The various types of interactions will be described below with reference to FIGS. 6A, 6B, 6C, 6D, and 6E.

Referring to FIG. 3A and FIG. 1D, when an input for moving a player 310 is received while the player 310 and the object 322 are in an auto battle mode, the auto battle mode may be paused while the player 310 moves. Further, movement GUIs 330 and 332 may be displayed as shown in FIG. 3A in response to receiving an input for moving the player 310. Further, the game providing device 6000 may display the interaction GUI 360 that disappeared in FIG. 1D in response to receiving the input for moving the player 310 during the auto battle mode.

FIGS. 3A and 3B show a process in which the disappeared interaction GUI 360 is displayed again in the display area 350. While the interaction GUI 360 is displayed again in the display area 350, the subsidiary GUIs 361, 362, 363, 364, 365, and 366 arranged in a lower right end of the game providing device 6000 may move based on the display area 350. For example, the subsidiary GUIs 361, 362, and 363 on the left of the display area 350 are moved in a left direction of the display area 350, and the subsidiary GUIs 364, 365, and 366 on the right of the display area 350 are moved in a right direction of the display area 350. The subsidiary GUIs 361, 362, 363, 364, 365, and 366 may be gradually reduced in size while moving, and the interaction GUI 360 in the display area 350 may be gradually increased in size, and thus, the interaction GUI 360 may be displayed in the form of pushing the subsidiary GUIs 361, 362, 363, 364, 365, and 366 outwards from the display area 350.

Referring to FIG. 3B, the player 310 may interact again with the object 322 in response to selection of one of the interaction GUI 360 and the subsidiary GUIs 361, 362, 363, 364, 365, and 366. That is, the paused auto battle mode may be resumed in response to selection of one of the interaction GUI 360 and the subsidiary GUIs 361, 362, 363, 364, 365, and 366.

FIG. 3C shows a state in which the paused auto battle mode is resumed in response to selection of the subsidiary GUI 363. As shown in FIG. 3C, in response to selection of the subsidiary GUI 363, a skill corresponding to the subsidiary GUI 363 may be enforced to the object 322 targeted by the player 310. Furthermore, because the auto battle mode of the player 310 with the object 322 is resumed, the player 310 may continuously attack the object 322 even when an additional input is not received by the game providing device 6000 after a skill is enforced. Only a normal attack may be performed in the auto battle mode.

According to one embodiment, when the player 310 moves away from the object 322 through movement during the auto battle mode, it may indicate that a user has an intention to run away from the enemy. The more the GUIs for the player 110 in the game 100, the higher the likelihood that a user's intention to leave a specific position or to run away from the enemy will be lost. However, according to one embodiment, all GUIs of the game 300 are located at the bottom, and thus, a possibility of selecting a corresponding GUI may be reduced beyond the intention to move.

Figure 4A:
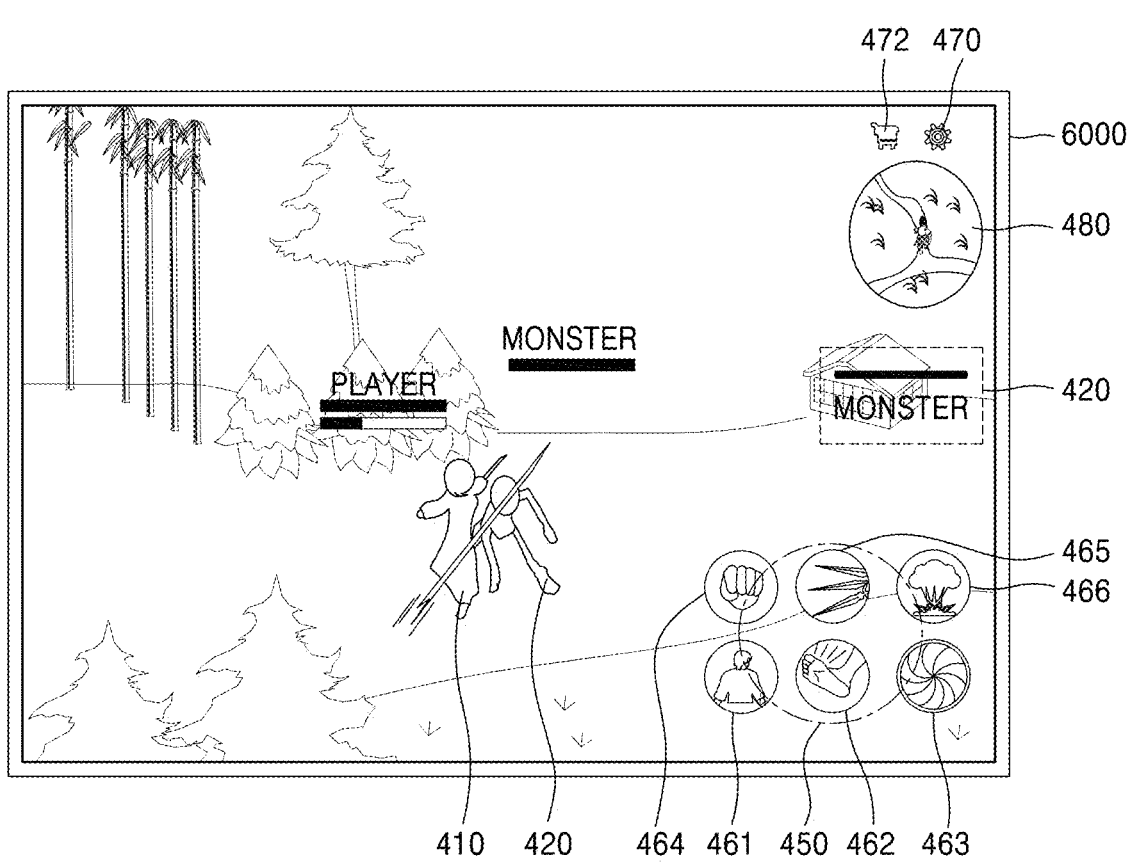
FIGS. 4A, 4B, and 4C are views showing a method of displaying an interaction GUI in a landscape mode, according to an embodiment.
Figure 4B:
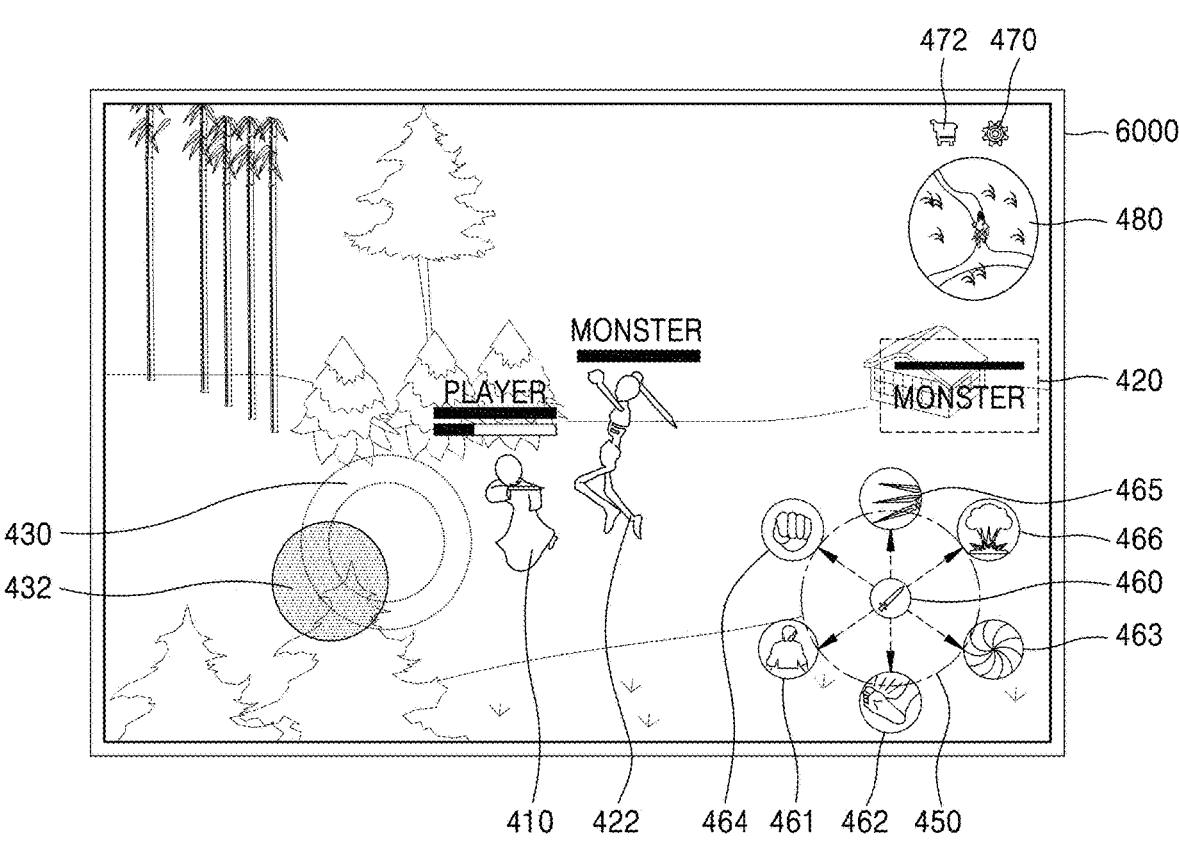
Figure 4C:
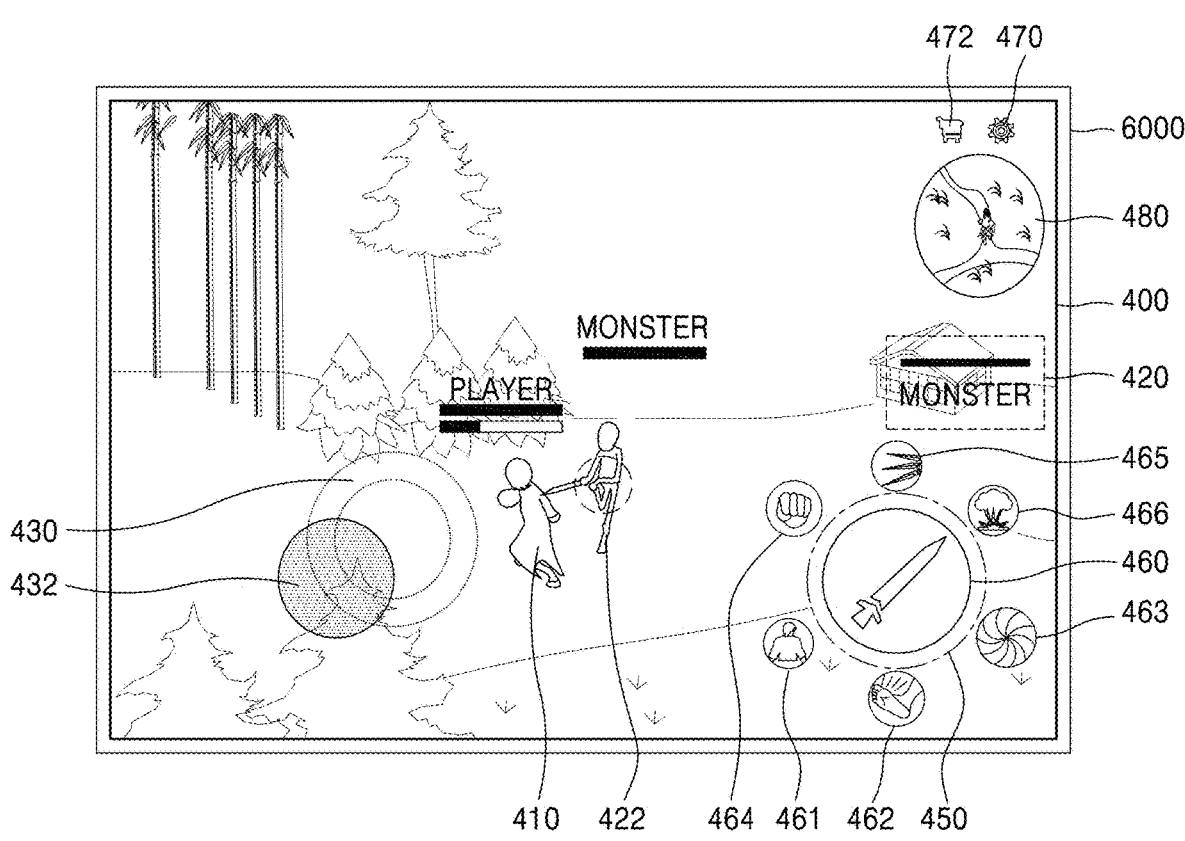

FIGS. 4A, 4B, and 4C are views showing a method of displaying an interaction GUI in a landscape mode, according to an embodiment.

According to one embodiment, the interaction GUI may be displayed in a display area independent of an object. Here, the display area independent of the object may indicate a fixed area according to device characteristics of the game providing device 6000 regardless of a property or a position of the object.

For example, referring to FIG. 4A, a display area 450 independent of an object 422 is located at a lower right end portion of the game providing device 6000, and an interaction GUI 460 is constantly displayed within a corresponding area 450 when displayed, and subsidiary GUIs 461, 462, 463, 464, 465, and 466 of the interaction GUI 460 may be arranged in at least one row at the corresponding lower right end portion. For example, as shown in FIG. 4A, the subsidiary GUIs 461, 462, 463, 464, 465, and 466 may be arranged in two columns at the lower right end portion of the display area 450. According to one embodiment, the display area 450 is not limited to the lower right end portion of the game providing device 6000 and may also be located at an upper right end portion, an upper left end portion, or a lower left end portion, and subsidiary GUIs 461, 462, 463, 464, 465, and 466 may also be arranged around the corresponding display area 450.

Here, the game providing device 6000 may be in a landscape mode or may be a device or a tablet optimized for the landscape mode. According to one embodiment, when the interaction GUI 460 is constantly displayed only in the display area 450 when displayed in a game 400, a user may have a consistent user experience. Accordingly, a user may easily play the game 400 with only one hand and may easily perform various types of interactions with various objects in the game 400 without looking at a screen.

FIG. 4B shows a state in which the player 410 interacts with the object 422 in an auto battle mode. As shown in FIG. 4B, when an input for moving the player 410 is received while interacting with the object 422 in the auto battle mode, the auto battle mode may be paused while the player 410 is moving. Further, movement GUIs 430 and 432 may be displayed as shown in FIG. 4B in response to receiving the input for moving the player 410. Further, the game providing device 6000 may display an interaction GUI 460 that disappeared in FIG. 4A in response to receiving the input for moving the player 410 during an auto battle mode.

FIGS. 4B and 4C show a process in which the disappeared interaction GUI 460 is displayed again in the display area 450. While the interaction GUI 460 is displayed again in the display area 450, the subsidiary GUIs 461, 462, 464, 464, 465, and 466 arranged in a lower right end of the game providing device 6000 may move radially around the display area 450. The subsidiary GUIs 461, 462, 464, 464, 465, and 466 are gradually reduced in size while moving, and the interaction GUI 460 may be gradually increased in size in the display area 450, and thus, the interaction GUI 460 may be displayed in the form of pushing the subsidiary GUIs 461, 462, 464, 464, 465, and 466 outwards from the display area 450.

Referring to FIG. 4C, the player 410 may interact again with the object 422 in response to selection of one of the interaction GUI 460 and the subsidiary GUIs 461, 462, 463, 464, 465, and 466. That is, the paused auto battle mode may be resumed in response to selection of one of the interaction GUI 460 and the subsidiary GUIs 461, 462, 463, 464, 465, and 466.

According to one embodiment, when the player 410 moves away from the object 422 through movement during the auto battle mode, it may indicate that a user has an intention to run away from the enemy. The more GUIs for the player 110 in the game 100 there are, the higher the likelihood that the user's intention to leave a specific position or run away from the enemy will be destroyed. However, according to one embodiment, all GUIs of the game 400 are located at the bottom, and thus, a possibility of selecting a corresponding GUI may be reduced beyond the intention to move.

Referring to FIGS. 4A, 4B, and 4C, the game providing device 6000 may display a game setting GUI 470, a shopping cart GUI 472, and a map GUI 480 in the game 400. A terminal optimized for a landscape mode may generally run a game at a higher resolution than a terminal optimized for a portrait mode, and thus, more content may be displayed on a screen. Accordingly, FIGS. 4A, 4B, and 4C show that the game setting GUI 470, the shopping cart GUI 472, and the map GUI 480 are displayed in the landscape mode but are not limited thereto. For example, corresponding GUIs may be displayed even in a portrait mode and may be displayed when the game providing device 6000 is shaken while covered at normal times. According to one embodiment, GUIs may be efficiently arranged and displayed within a limited screen.

Figure 5:
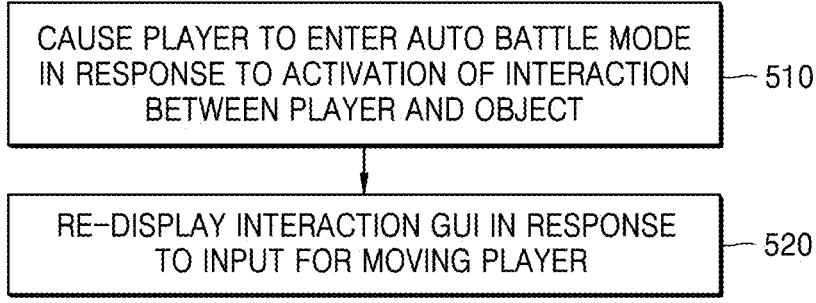
FIG. 5 is a flowchart of a method of re-displaying an interaction GUI, according to an embodiment.

FIG. 5 is a flowchart of a method of re-displaying an interaction GUI, according to an embodiment.

The method of re-displaying the interaction GUI, according to the embodiment, may follow the method described with reference to FIG. 2. That is, the method of re-displaying the interaction GUI may proceed to step 510 through steps 210, 220, 230, and 240.

In step 510, a game providing device may cause a player to enter an auto battle mode in response to activation of an interaction between the player and one object. As described above, the interaction between the player and the one object may start or may be activated in response to selection of an interaction GUI or selecting a corresponding object from an object list.

In step 520, the interaction GUI may be re-displayed in response to an input for moving the player in the auto battle mode. Step 520 is substantially the same as the descriptions given with reference to FIGS. 3A, 3B, 3C, 4A, 4B, and 4C, and thus redundant descriptions thereof are omitted.

FIGS. 6A, 6B, 6C, 6D, and 6E are views showing various GUIs of a game.

Figure 6A:
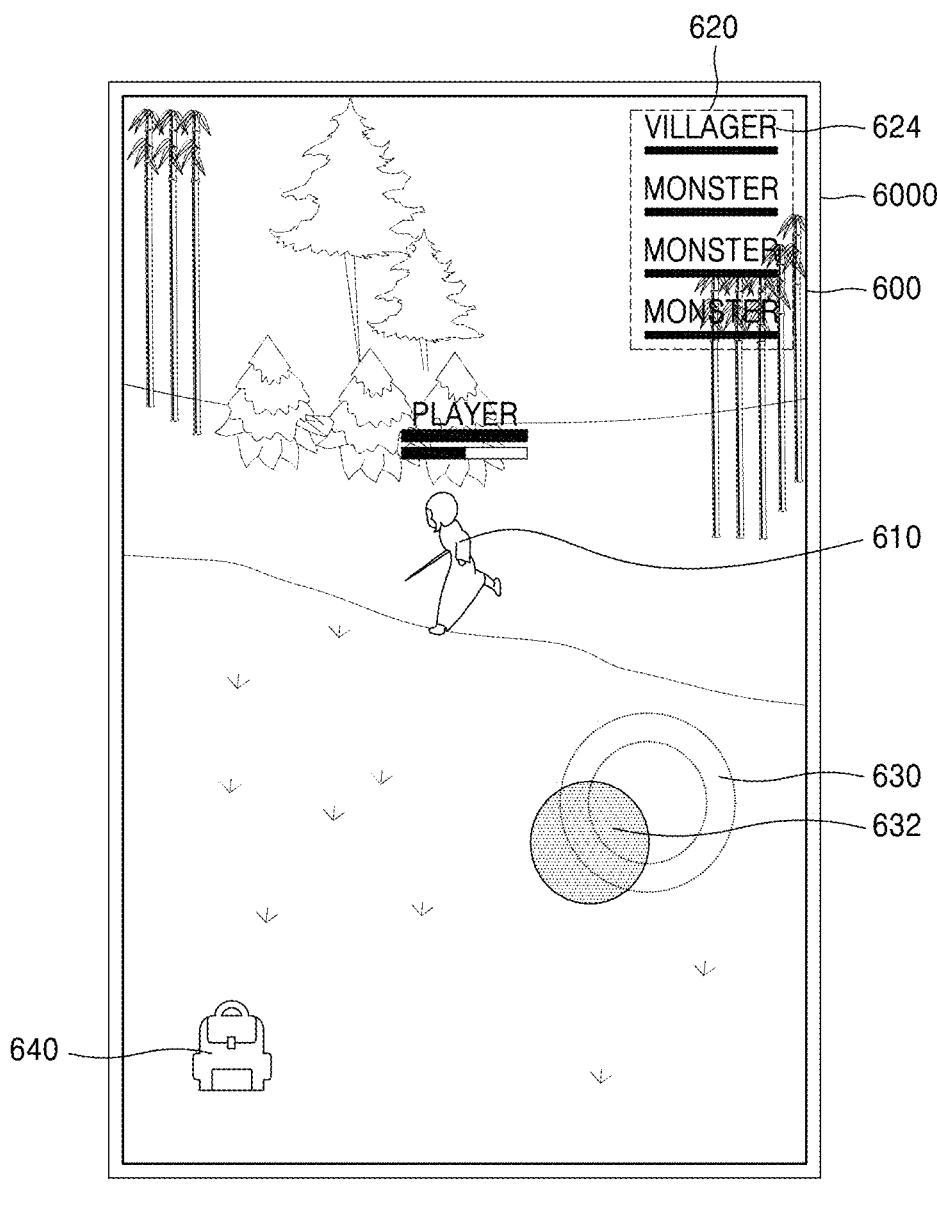
FIGS. 6A, 6B, 6C, 6D, and 6E are views showing various GUIs of a game.

Referring to FIG. 6A, the game providing device 6000 determines a plurality of objects that may interact with a player 610 in a space where the player 610 is located and may display an object list 620 within the game 600. For example, a space may be defined according to characteristics of the space within the game. For example, the space may include a dungeon, a village, a castle, a fortress, an underground cave, a grassland, a forest, a desert, a town, a sea, and so on, and a player may interact with an object located in the same space. The space may also be defined as a place having the same place name in the game or may also be defined as a place expressed in the same map but is not limited thereto. For example, the space may also indicate a space within a predetermined distance from a player.

According to one embodiment, the object list 620 may be aligned based on a distance between the player 610 and the objects. That is, referring to FIG. 6A, a villager object 624 may be closest to the player 610 among objects in the space.

Referring to FIG. 6A, a user may control and move the player 610 by touching a screen of the game providing device 6000 on which the game 600 is displayed, that is, based on a manual input. For example, the player 610 of a user may move. According to one embodiment, when the player 610 stops movement while moving in response to a manual input in a non-battle mode, for example, when a touch to the game providing device 6000 is released, the interaction GUI 660 may be displayed. In addition, when the player 610 resumes movement in response to the manual input in the non-battle mode and continues the movement, the interaction GUI 660 may not be displayed in the game 600. When the player 610 is moving in the non-battle mode, a user's intention may indicate that the user wants to quickly move to a specific position rather than battle. According to one embodiment, while the player moves in response to the manual input in the non-battle mode, the interaction GUI 660 is not displayed, and thus, the player 610 may completely concentrate on the movement.

Figure 6B:
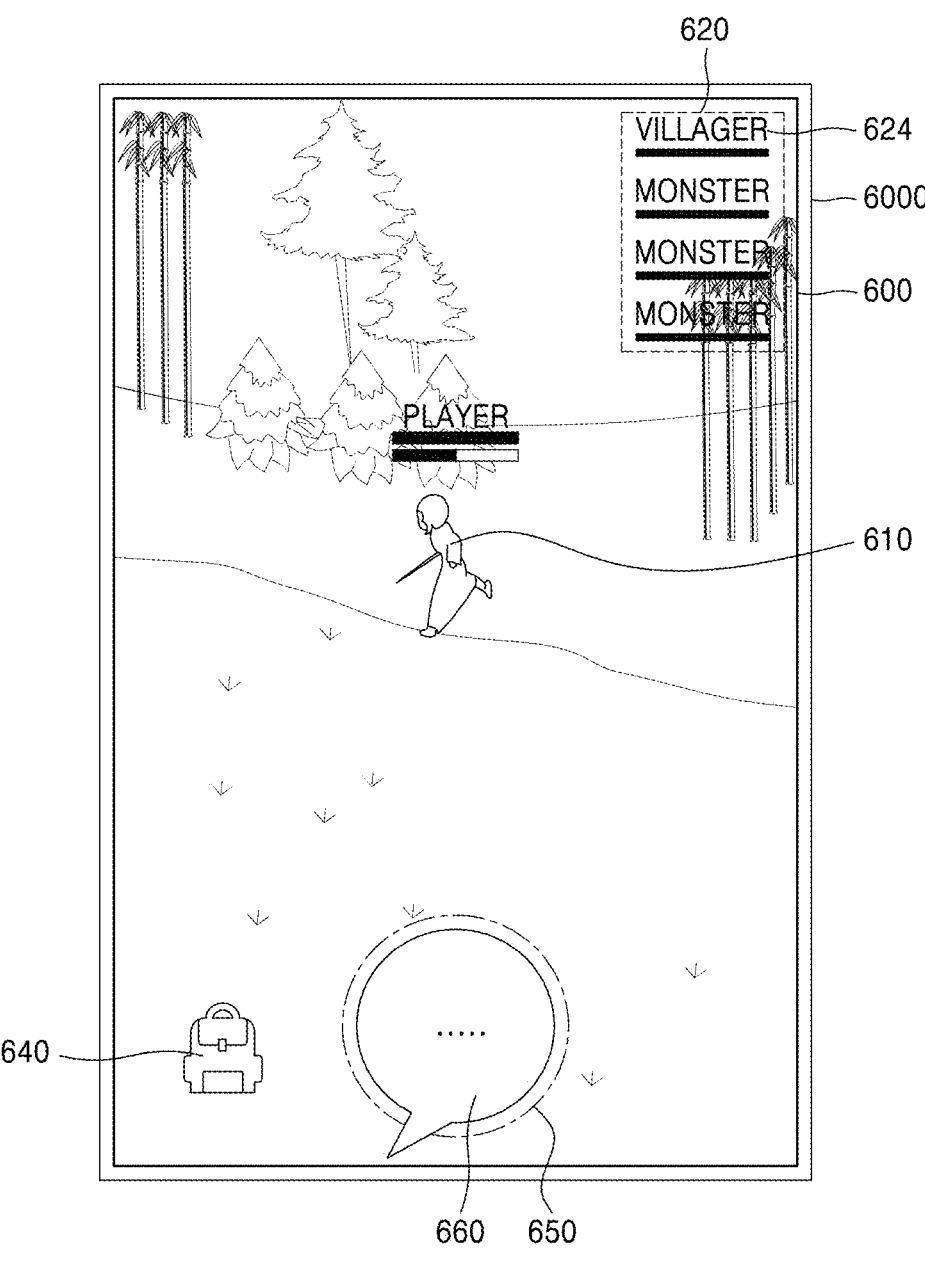

Referring to FIG. 6B, in response that the player 610 stops movement according to the manual input in the non-battle mode, that is, in response to releasing a touch to the game providing device 6000, the interaction GUI 660 may be displayed within the game 600. The interaction GUI 660 may correspond to one of objects interactable with the player in a space where the player 610 is located. According to one embodiment, one object corresponding to the interaction GUI 660 may be implemented as an object closest to the player 610 but is not limited thereto. For example, an interaction GUI corresponding to an object selected by a user from the object list 620 may also be displayed. The object selected from the object list 620 may be targeted by the player 610. The targeting of object is described above with reference to FIGS. 1A, 1B, and 1C.

Referring to FIG. 6B, the interaction GUI 660 may have a state corresponding to a property of the corresponding object 624. For example, in FIG. 6B, a property of the villager object 624 may be non-hostile to a player, and a speech bubble GUI 660 indicating a conversation with the non-hostile object may be displayed. When a property of the corresponding object 624 is hostile to a player in the interaction GUI 660, an auto battle GUI for entering an auto battle mode with a hostile object may be displayed. A property of the object may be previously determined in the game 600, and may also be determined based on skill, ability, reputation, conduct, achievement, and so on of the player 610 in the game 600.

In one embodiment, the interaction GUI 660 may be a GUI for conversation, automatic battle, automatic movement, acquisition, boarding, or trading. For example, an automatic movement GUI for moving the player 610 to a specific position may be displayed. For example, when an event occurs at a specific position, a corresponding automatic movement GUI may be displayed by using a position where a corresponding event occurs as an object. Accordingly, when the automatic movement GUI is displayed as the interaction GUI 660, a user may move to a corresponding position by selecting the corresponding interaction GUI 660 (that is, the automatic movement GUI).

In one embodiment, when there is a treasure box or item around the player 610, an acquisition GUI for acquiring the treasure box or item may be displayed by using the treasure box or item as an object. Accordingly, when the acquisition GUI is displayed as the interaction GUI 660, a user may select the corresponding interaction GUI 660 (that is, the acquisition GUI), and then move to a place where there is a corresponding treasure box or item to acquire the corresponding treasure box or item.

In one embodiment, when there is a transportation system around the player 610, a boarding GUI for riding the transportation system may be displayed by using the transportation system as an object. Accordingly, when the boarding GUI is displayed as the interaction GUI 660, a user may select the corresponding interaction GUI 660 (that is, the boarding GUI) to move to a corresponding transportation system and board, thereby moving to a destination of the transportation system. When the destination of the transportation system is not determined, a user may also move selectively through the transportation system.

In one embodiment, when there is another player around the player 610, a transaction GUI for trading with a corresponding player may be displayed by using the player as an object. Accordingly, when the transaction GUI is displayed as the interaction GUI 660, the player 610 may immediately move toward the corresponding player, or a transaction window may be popped up when the corresponding player agrees.

According to one embodiment, various interaction GUIs 660 may be displayed on a fixed display area 650 according to a property of an object, and thus, a user may interact with various objects only by touching the same area 650 regardless of the type of interaction. Accordingly, according to one embodiment, not only an auto battle but also progression of a story of a game may be very easily performed.

Figure 6C:
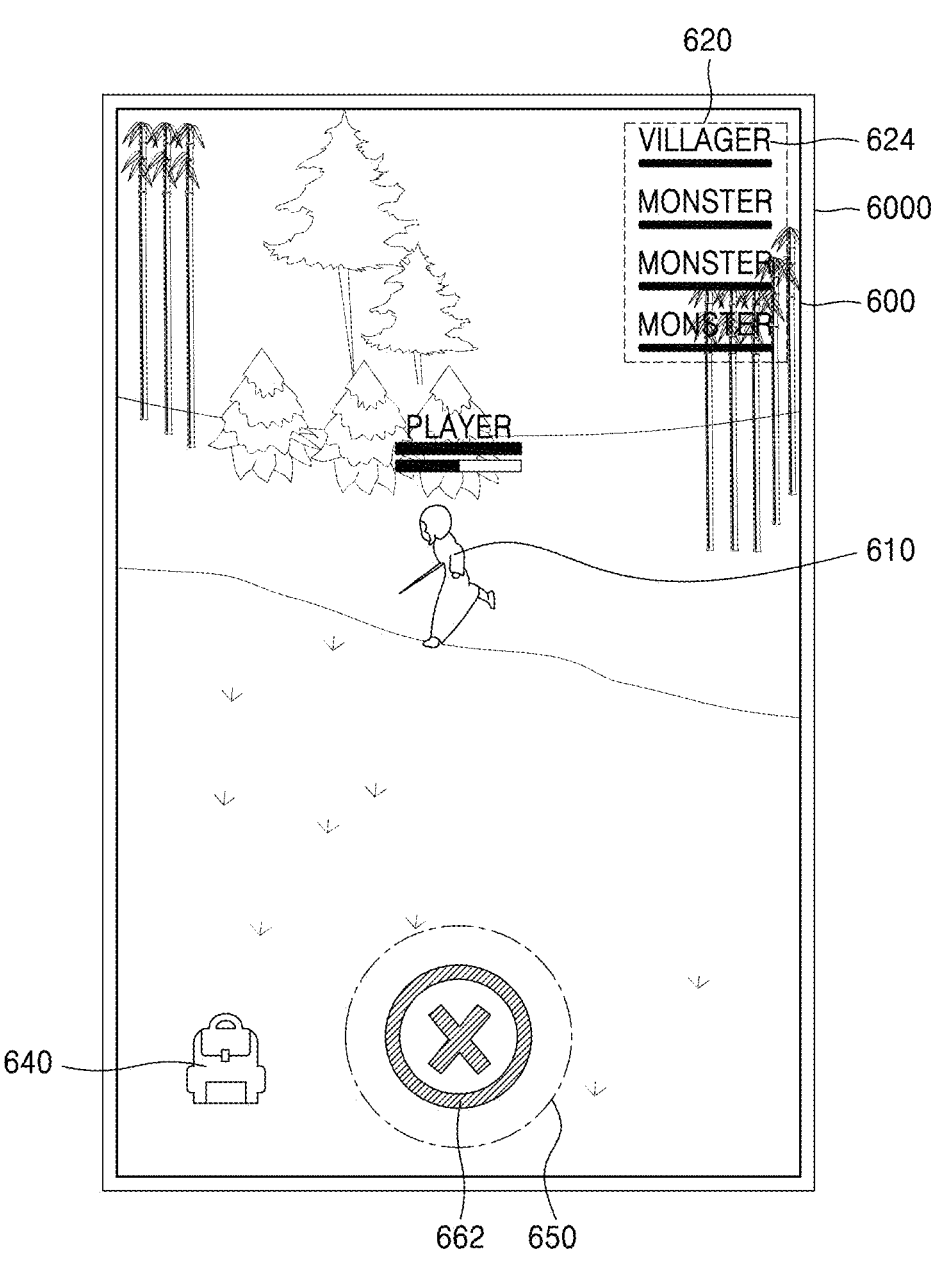

Referring to FIG. 6C, while the player 610 moves to interact with the object 624, an interaction stop GUI 662 for stopping a corresponding interaction may be displayed. Movement of the player 610 may be stopped in response to selection of the interaction stop GUI 662, and furthermore, the interaction GUI 660 may be re-displayed instead of the interaction stop GUI 662. Accordingly, the player 610 may stop taking steps at any time during the interaction and perform another action (or interaction with another object).

Figure 6D:
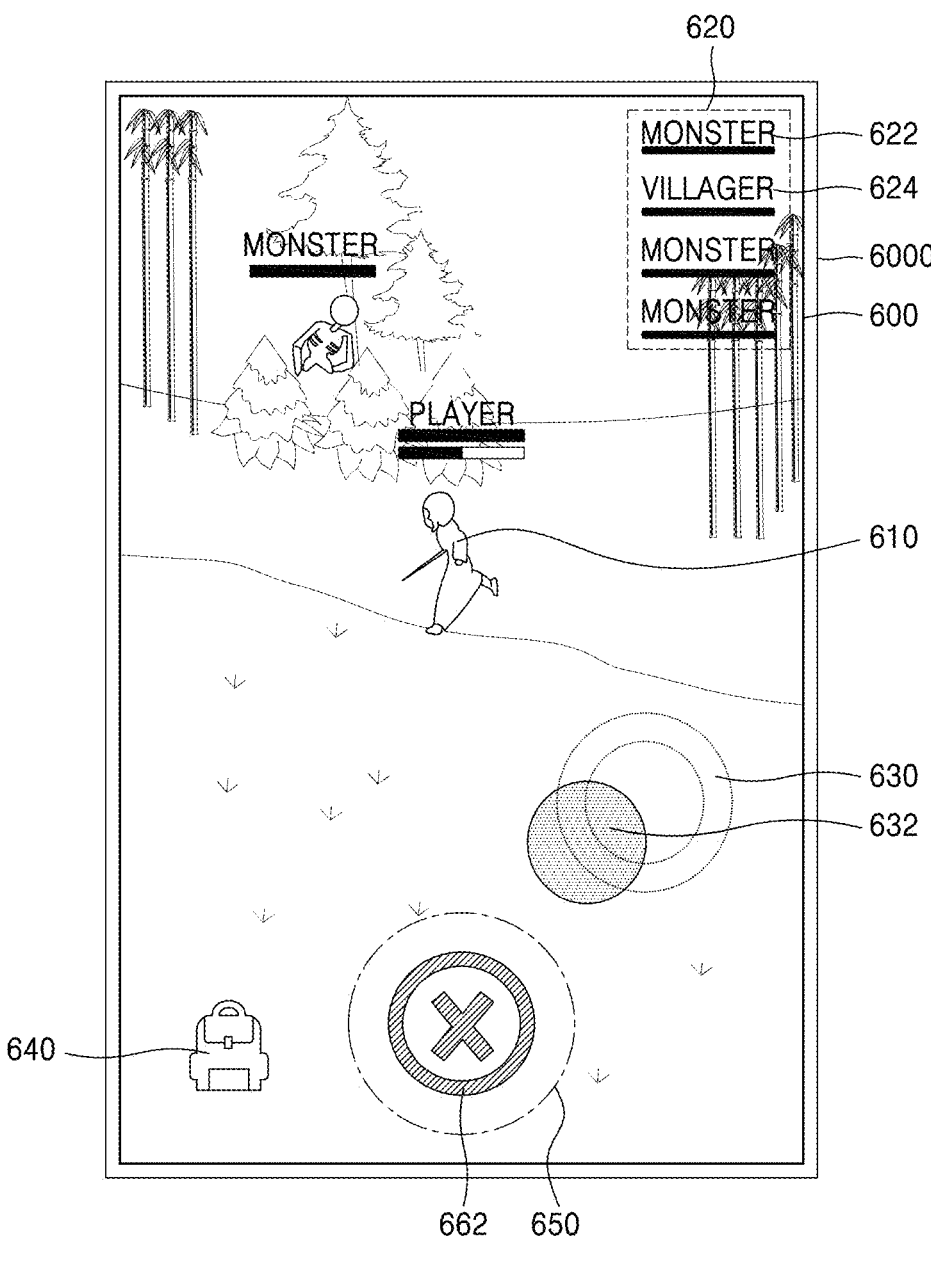
Figure 6E:
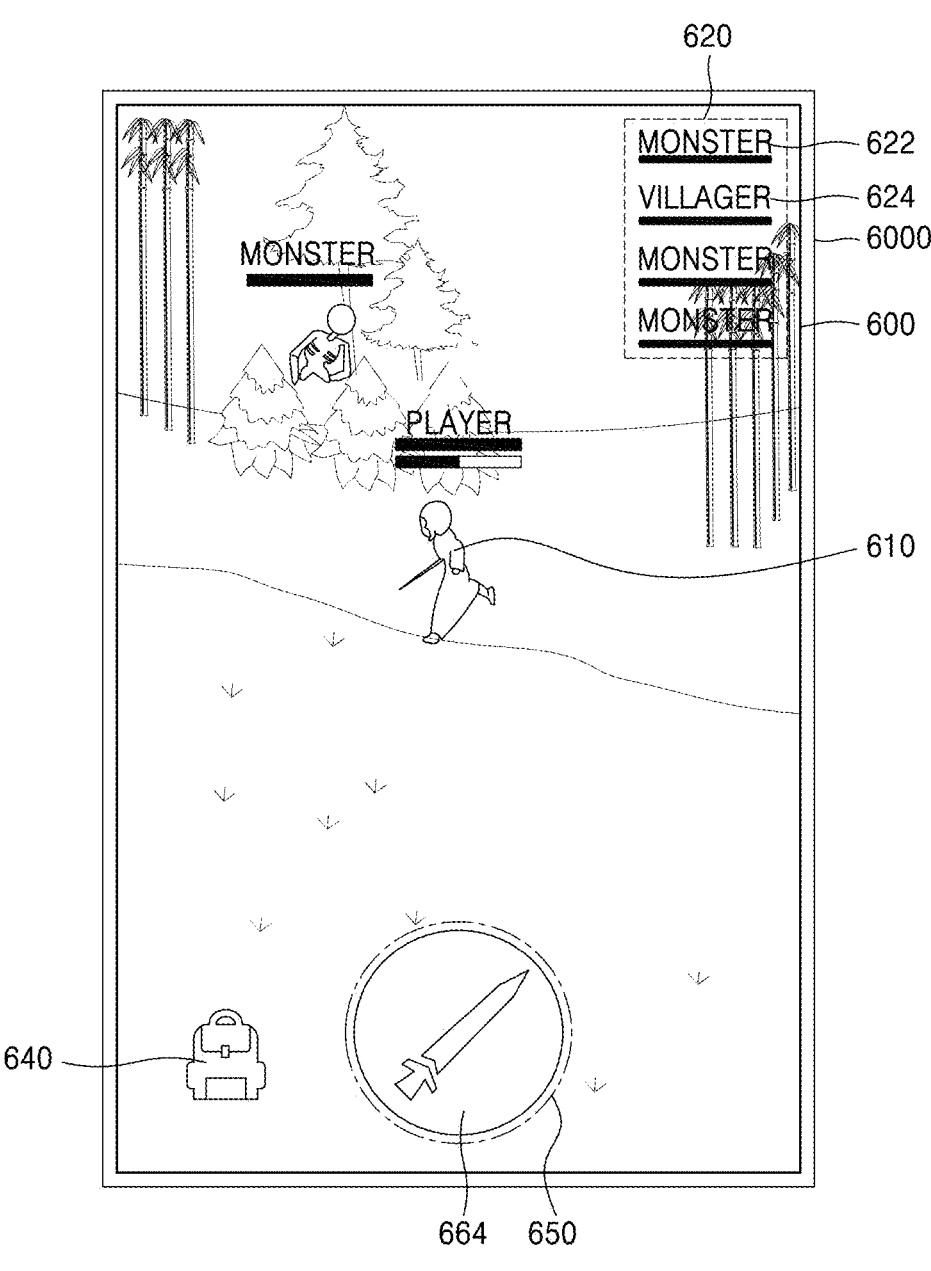

For example, referring to FIG. 6D, when a hostile object 622, that is, a monster appears while the player 610 is moving, the player 610 may stop movement to interact with the villager object 624 and interact with a monster object 622. In order to stop movement to interact with the villager object 624, the player may select the interaction stop GUI 662 or stop the movement after manual movement, and thus, an automatic battle GUI 664 for interacting with the monster object 622 may be displayed as shown in FIG. 6E. Displaying the interaction GUI according to stop of movement is described above with reference to FIGS. 1A, 1B, and 1C.

According to one embodiment, the movement may be stopped even by the interaction stop GUI 662. When the movement is stopped by releasing a touch input after a manual movement, the movement may be stopped at a position that does not match a user's intention. In addition, the movement of the player 610 may be stopped in a right place at a right time by the interaction stop GUI 662.

Figure 7:
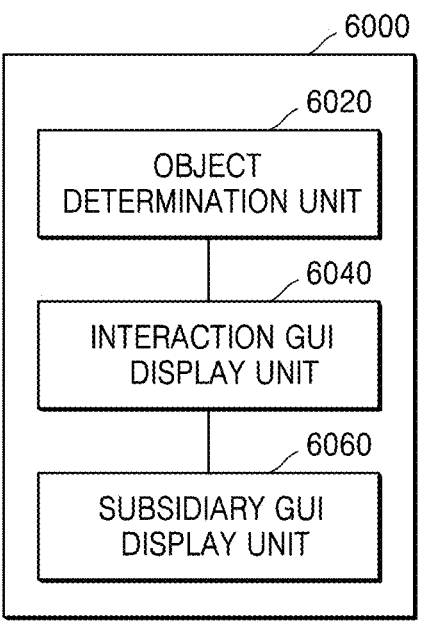
FIG. 7 is a block diagram of a game providing device according to an embodiment.

FIG. 7 is a block diagram of a game providing device according to an embodiment.

Referring to FIG. 7, the game providing device 6000 according to an embodiment may include an object determination unit 6020, an interaction GUI display unit 6040, and a subsidiary GUI display unit 6060.

The object determination unit 6020 may determine at least one object that may interact with a player in a space where the player is located, and a function of the object determination unit 6020 is substantially the same as the description of step 210 of FIG. 2, and thus, redundant description thereof is omitted.

The interaction GUI display unit 6040 may display an interaction GUI corresponding to one object among at least one object determined by the object determination unit 6020, and a function of the interaction GUI display unit 6040 is substantially the same as the description of step 220 of FIG. 2, and thus, redundant description thereof is omitted.

When an interaction between the player and the one object is activated, the subsidiary GUI display unit 6060 may display a subsidiary GUI of the interaction GUI without displaying the interaction GUI, and a function of the subsidiary GUI display unit 6060 is substantially the same as the description of steps 230 and 240 of FIG. 2, and thus, redundant description thereof is omitted.

The object determination unit 6020, the interaction GUI display unit 6040, and the subsidiary GUI display unit 6060 indicate units that process at least one function or operation and should not be understood to be implemented only by one hardware configuration and may also be implemented as hardware, software, or a combination of hardware and software. Each or all of the object determination unit 6020, the interaction GUI display unit 6040, and the subsidiary GUI display unit 6060 may be implemented by a memory for storing an instruction and a processor configured to perform the instruction.

The game providing device 6000 may consist of a terminal but is not limited thereto. For example, the game providing device 6000 may also consist of a server or a system including the server and a terminal. According to one embodiment, functions of the game providing device 6000 may be performed by both the terminal and the server, or some of the functions may be performed by the terminal and the other functions may be performed by the server. Each configuration of the game providing device 6000 described above may be implemented by an interaction between a plurality of devices, for example, a server and a terminal, and the interaction between the server and the terminal may be implemented within each configuration as necessary.

Figure 8:
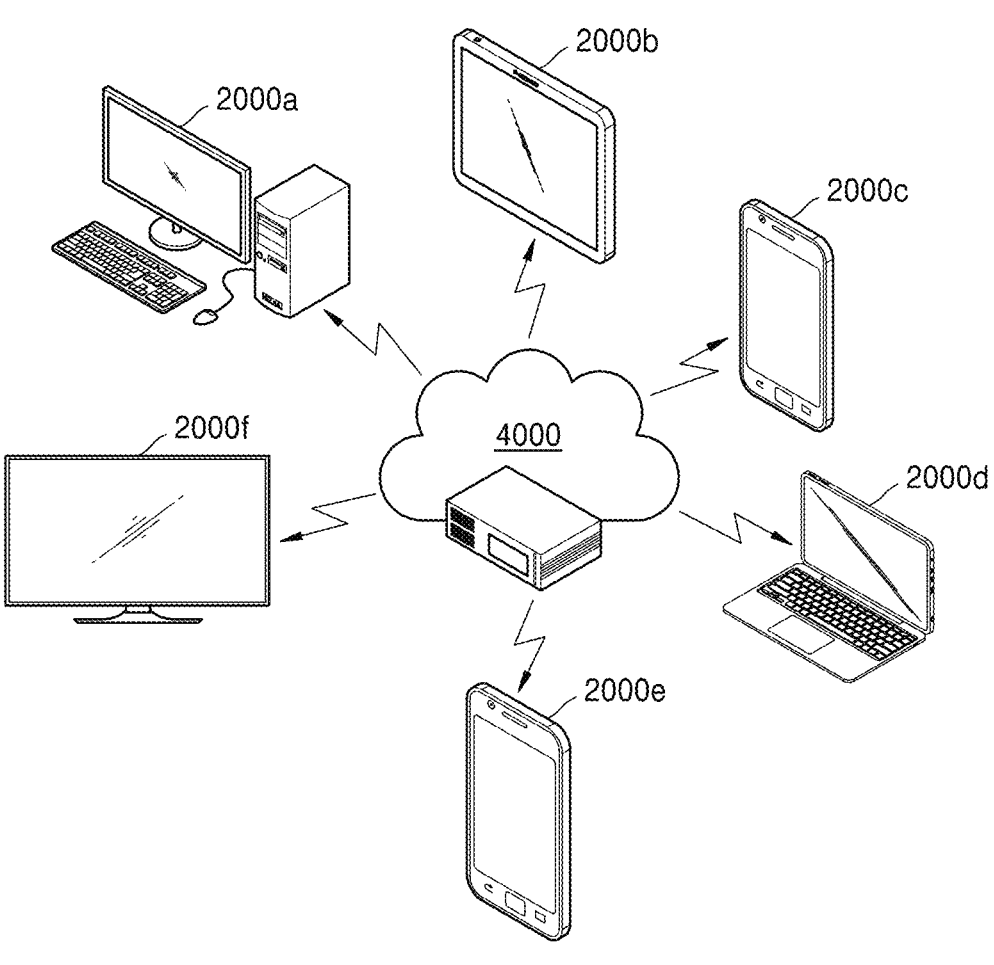
FIG. 8 shows an online game providing system including a server and a terminal, according to an embodiment.

FIG. 8 shows an online game providing system including a server and a terminal according to an embodiment.

Figure 9:
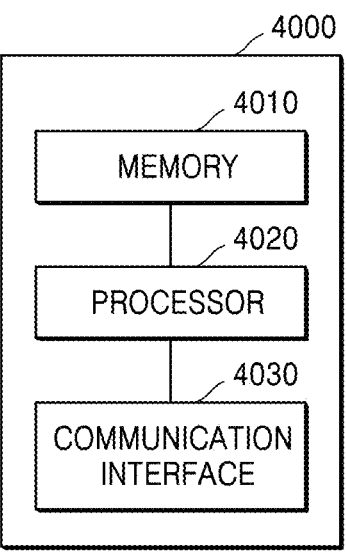
FIG. 9 is a block diagram of a server according to an embodiment.

The online game providing system according to the embodiment may include a server 4000 and a plurality of terminals 2000a, 2000b, 2000c, 2000d, 2000e, and 2000f as shown in FIG. 9. The server 4000 may service an online game to the plurality of terminals 2000a, 2000b, 2000c, 2000d, 2000e, and 2000f by serving the online game through a network.

FIG. 8 shows a desktop computer 2000a, a tablet 2000b, a mobile phone 2000c, a notebook 2000d, a smartphone 2000e, and a television 2000f as examples of terminals used by a user, and the terminals are not limited thereto and may include various electronic devices such as a personal digital assistant (PDA), a portable multimedia player (PMP), a navigation device, a moving picture experts group (MPEG) audio layer-3 (MP3) player, a digital camera, a refrigerator, a washing machine, and a vacuum cleaner.

According to some embodiments, the server 4000 may be operated by a game provider, and the server 4000 may include a single server, a set of servers, and a cloud server but is not limited thereto. The server 4000 provides an online game to a user and may include a database for storing data of users. In addition, the server 4000 may further include a payment server for generating and processing a payment event.

According to some embodiments, a network may indicate a connection established (or formed) by using any communication method and may indicate a communication network through which data is transmitted between the terminals 2000a, 2000b, 2000c, 2000d, 2000e, and 2000f or between the terminals 2000a, 2000b, 2000c, 2000d, 2000e, and 2000f and the server 4000, and which is connected through all communication systems.

The communication system includes a communication performed through a predetermined communication standard, a predetermined frequency band, a predetermined protocol, or a predetermined channel, a short-range communication, a long-distance communication, a wireless communication, and a wired communication. For example, the communication system may include a communication system performed through Bluetooth, Bluetooth low energy (BLE), wireless fidelity (Wi-Fi), Zigbee, third generation (3G), long-term evolution (LTE), and an ultrasonic wave but is not limited thereto.

The short-range communication system may indicate a communication system capable of communicating with each other only when devices that perform a communication are within a predetermined range and may include, for example, Bluetooth and near field communication (NFC) but is not limited thereto.

The long-distance communication may indicate a communication system in which devices that perform a communication may communicate with each other regardless of a distance. For example, a long-distance communication system includes a system that may perform a communication even when two devices that communicate with each other through a repeater such as a wireless access point (AP) have a predetermined distance or more therebetween, and a communication system that uses a cellular network (3G and LTE) used for text transmission and phone calls but is not limited thereto.

A communication between the server 4000 and the terminals 2000*a*, 2000*b*, 2000*c*, 2000*d*, 2000*e*, and 2000*f* may be performed through a certain communication system while the server 4000 services an online game by using a network.

An online game may include various genres of games such as a role playing game (RPG), a tabletop RPG (TRPG), a massively multiplayer online RPG (MMORPG), a multiplayer online battle arena (MOBA), an aeon of strife (AOS), a real time strategy (RTS), a first-person shooter (FPS), a trading card game (TCG), a collectible card game (CCG), a shooting game, a match shooting game, a team match shooting game, sports, and fighting, but is not limited thereto. The online game may be played as a match between users or a match between a user and a computer (for example, artificial intelligence) but is not limited thereto and may be implemented in various forms.

FIG. 9 is a block diagram of a server according to an embodiment.

As shown in FIG. 9, a server 4000 may include a memory 4010, a processor 4020, and a communication interface 4030. However, not all of the components shown in FIG. 9 are essential components of the server 4000. The server 4000 may consist of more or fewer components than the components shown in FIG. 9.

The memory 4010 may store a program used for processing and control of the processor 4020, or an instruction constituting the program, and may also store data that is inputted to the server 4000 or outputted from the server 4000.

The memory 4010 may store instructions that enable the server 4000 to perform various operations according to an embodiment of the present disclosure. In addition, the memory 4010 may store information necessary for servicing an online game. For example, the memory 4010 may store information on a user's account, characters, and items but is not limited thereto and may store various information.

The memory 4010 may include at least one type of storage medium among a flash memory type, a hard disk type, a multimedia card micro type, a card type memory (for example, a secure digital (SD) memory, an extreme digital (XD) memory, and so on), random access memory (RAM), static random access memory (SRAM), read-only memory (ROM), electrically erasable programmable read-only memory (EEPROM), programmable read-only memory (PROM), magnetic memory, a magnetic disk, and an optical disk. Programs stored in the memory 4010 may also be divided into a plurality of modules according to functions thereof.

The processor 4020 generally controls an overall operation of the server 4000. For example, the processor 4020 may control components included in the server 4000 by executing a program stored in the memory 4010. The processor 4020 may consist of a plurality of processors, for example, one or more central processing units (CPUs), one or more graphic processing units (GPUs), or a combination thereof.

The processor 4020 may cause the server 4000 to perform various operations according to various embodiments of the present disclosure by executing instructions stored in the memory 4010.

The communication interface 4030 may consist of an electronic circuit designed to conform to a predetermined standard so that the server 4000 may communicate with other devices.

The communication interface 4030 may include a Bluetooth communication interface, a BLE communication interface, a near field communication interface, a Wi-Fi communication interface, a Zigbee communication interface, an infrared data association (IrDA) communication interface, a Wi-Fi direct (WFD) communication interface, an ultrawideband (UWB) communication interface, an ant+ communication interface, a 3G communication interface, an LTE communication interface, or a five generation (5G) communication interface, but is not limited thereto.

The communication interface 4030 may transmit information according to various embodiments of the present disclosure. Operators of an online game may communicate with the server 4000 by using a device other than the server 4000. The operators may use a dedicated program to communicate with the server 4000 but is not limited thereto. For example, the operators may also communicate with the server 4000 through a web browser, and the server 4000 may also require authentication of the operators that attempt to access the server 4000.

Figure 10:
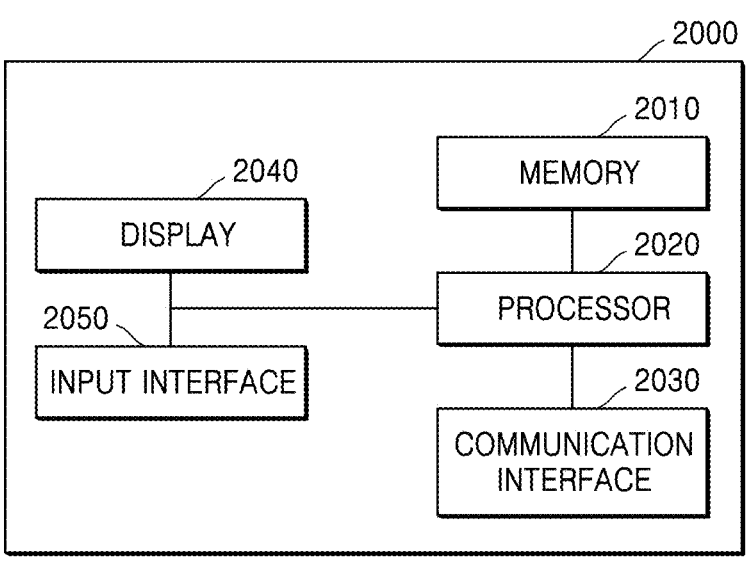
FIG. 10 is a block diagram of a terminal according to an embodiment.

FIG. 10 is a block diagram of a terminal according to an embodiment.

As shown in FIG. 10, a terminal 2000 may include a memory 2010, a processor 2020, a communication interface 2030, a display 2040, and an input interface 2050. However, not all of the components shown in FIG. 10 are essential components of the terminal 2000. The server 2000 may consist of more or fewer components than the components shown in FIG. 10.

Description on the memory 2010, the processor 2020, and the communication interface 2030 included in the terminal 2000 may refer to the memory 4010, the processor 4020, and the communication interface 4030 included in the server 4000 described above.

The memory 2010 may store instructions that enable the terminal 2000 to perform various operations according to an embodiment of the present disclosure. In one embodiment, the memory 2010 may store a game and data related thereto.

The processor 2020 may cause the terminal 2000 to perform various operations according to various embodiments of the present disclosure by executing instructions stored in the memory 2010. In one embodiment, the processor 2020 may execute a game stored in the memory 2010 or may receive data related to the game.

The communication interface 2030 may transmit information according to various embodiments of the present disclosure.

The display 2040 visualizes information processed by the processor 2020. The information displayed by the processor 2020 may be visualized through the display 2040. The display 2040 may include at least one of a liquid crystal display, a thin film transistor-liquid crystal display, an organic light-emitting diode, a flexible display, a three-dimensional (3D) display, and an electrophoretic display. When the display and a touch pad have a layer structure to form a touchscreen, the display may also function as the input interface 2050.

The input interface 2050 is a component designed to enable the terminal 2000 and a user who uses the terminal 2000 to interact with each other. The input interface 2050 may include a key pad, a dome switch, a touch pad (a contact-type capacitive method, a pressure-type resistive film method, an infrared sensing method, a surface ultrasonic conduction method, an integral tension measurement method, a piezo effect method, or so on), a jog wheel, and a jog switch but is not limited thereto.

The device described above may be implemented as a hardware component, a software component, and/or a combination of the hardware component and the software component. For example, the devices and components described in the embodiments may consist of one or more general-purpose computers or special-purpose computers such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and one or more software applications executed on the operating system. In addition, the processing device may also access, store, operate, process, and generate data in response to execution of software. Although it is sometimes described that one processing device is used for the sake of convenient understanding, one of ordinary skill in the art may know that the processing device may include a plurality of processing elements and/or a plurality of types of processing elements. For example, the processing device may include a plurality of processors or may include one processor and one controller. In addition, it is possible to provide another processing configuration such as a parallel processor.

The software may include a computer program, codes, instructions, or a combination thereof and may configure a processing device to operate as desired or may instruct the processing device independently or collectively. In order to be interpreted by a processing device or to provide an instruction or data to the processing device, software and/or data may be embodied permanently or temporarily for any type of machine, a component, a physical device, a virtual equipment, a computer storage medium or device, or a signal wave which is transmitted. Software may also be distributed to networked computer systems to be stored therein or executed thereby. Software and data may be stored on one or more computer-readable recording media.

A method according to an embodiment may be implemented in the form of program instructions that may be executed by various computer systems to be recorded in a computer-readable medium. The computer-readable medium may include program instructions, data files, data structures, and so on alone or in combination. The program instructions recorded on the medium may be specially designed and configured for the embodiment or may also be known and usable to those skilled in computer software. For example, the computer-readable recording media may include magnetic media such as a hard disk, a floppy disk, and a magnetic tape, optical media such as a compact disc read-only memory (CD-ROM) and a digital versatile disk (DVD), magnetic-optical media such as floptical disks, and a hardware device specially configured to store and execute program instructions, such as ROM, RAM, and flash memory. For example, the program instructions include not only machine language codes such as codes produced by a compiler but also high-level language codes that may be executed by a computer by using an interpreter or so on. The hardware device described above may be configured to operate as one or more software modules to perform the operation of the embodiment, and vice versa.

Although the embodiments are described by the limited embodiments and drawings as described above, those skilled in the art may perform various modifications and variations from the above description. For example, even when the described techniques are performed in an order different from the described method, and/or even when components of a system, a structure, a device, a circuit, or so on described above are coupled or combined in a form different from the described method or substituted with other components or equivalents, an appropriate result may be achieved.

Therefore, other implementations, other embodiments, and those equivalent to the claims also fall within the scope of the claims to be described below.

The invention claimed is:

1. A game providing method comprising:

detecting at least one object interactable with a player in a space where the player is located;

displaying, as triggered by detecting the at least one object, an interaction graphic user interface (GUI) for activating an interaction between the player and one object of the at least one object in a predetermined display area;

displaying at least one subsidiary GUI of the interaction GUI in an area overlapping at least a portion of the predetermined display area without displaying the interaction GUI when the interaction between the player and the one object is activated, causing the player to enter an auto mode; and re-displaying the interaction GUI in response to a user input for moving the player, when the interaction between the player and the one object is paused, causing the auto mode is paused.

2. The game providing method of claim 1, wherein the interaction GUI is not displayed while the player is moved based on a manual input.

3. The game providing method of claim 2, further comprising displaying a movement GUI corresponding to the manual input, wherein the interaction GUI is displayed in response to stopping movement of the player.

4. The game providing method of claim 1, wherein the interaction between the player and the one object is activated based on selection of the interaction GUI.

5. The game providing method of claim 1, further comprising displaying a list of the at least one object, wherein, when the one object is selected from the list, the interaction between the player and the one object is activated.

6. The game providing method of claim 1, further comprising displaying a basic GUI related to setting of the player, wherein, when the interaction between the player and the object is activated, the basic GUI is not displayed and the at least one subsidiary GUI is displayed.

7. The game providing method of claim 1, wherein the auto mode comprises an auto battle mode against the one object in response to activation of the interaction between the player and the one object when the one object is hostile to the player, wherein the one object is targeted by the player, and wherein the at least one subsidiary GUI includes a skill GUI that is usable while the player fights against the one object.

8. The game providing method of claim 7, wherein the predetermined display area is located in the center of a lower portion of a screen, and the at least one subsidiary GUI is arranged in a line at the lower portion, in a portrait mode.

9. The game providing method of claim 7, wherein the user input for moving the player, causes the player to enter a non-battle mode from the auto battle mode, and wherein the interaction GUI is displayed together with the at least one subsidiary GUI and the auto battle mode is paused while the player is moving.

10. The game providing method of claim 9, wherein the interaction GUI is re-displayed as pushing the at least one subsidiary GUI outwards from the display area, and wherein the at least one subsidiary GUI is reduced in size as being pushed outwards from the predetermined display area by the interaction GUI.

11. The game providing method of claim 10, wherein the at least one subsidiary GUI is pushed to left and right from the predetermined display area in a portrait mode.

12. The game providing method of claim 9, wherein the battle mode is resumed and the interaction GUI is not displayed and the at least one subsidiary GUI is displayed in response to selection of the interaction GUI or the at least one subsidiary GUI.

13. The game providing method of claim 7, wherein the predetermined display area is located in an area near a lower right end or a lower left end of a screen and the at least one subsidiary GUI is arranged in at least one row the area near the lower right end or the lower left end in a landscape mode.

14. The game providing method of claim 13, further comprising re-displaying the interaction GUI in response to an input for moving the player while pushing the at least one subsidiary GUI in a radial direction from the display area, wherein the interaction GUI is displayed together with the at least one subsidiary GUI and the battle mode is paused while the player is moving.

15. The game providing method of claim 13, wherein the one object is untargeted by the player based on a distance between the player and the one object.

16. The game providing method of claim 1, wherein the at least one object is located within a predetermined area in the space.

17. The game providing method of claim 1, wherein the one object is targeted by the player as the closest to the player among the at least one object in the space.

18. The game providing method of claim 1, wherein the interaction GUI has a state corresponding to a property of the one object, and wherein the interaction GUI is a dialog GUI, a battle GUI, an automatic movement GUI, an acquisition GUI, a boarding GUI, or a transaction GUI.

19. A non-transitory computer-readable recording medium comprising:

a program configured to cause a computer to execute the game providing method according to claim 1.

20. A game providing device comprising:

a memory configured to store instructions; and at least one processor configured to execute the instructions, wherein the at least one processor executes the instructions to:

detect at least one object interactable with a player in a space where the player is located;

display, as triggered by detecting the at least one object, an interaction graphic user interface (GUI) for activating an interaction between the player and one object of the at least one object in a predetermined display area;

display at least one subsidiary GUI of the interaction GUI in an area overlapping at least a portion of the predetermined display area without displaying the interaction GUI when an interaction between the player and the one object is activated, causing the player to enter an auto mode; and re-displaying the interaction GUI in response to a user input for moving the player, when the interaction between the player and the one object is paused, causing the auto mode is paused.

* * * * *